United States Patent [19]

Tsubuko et al.

[11] Patent Number: 5,189,102
[45] Date of Patent: Feb. 23, 1993

[54] METHOD FOR PRODUCING A VINYL RESIN USING A SILICON OIL SOLVENT

[75] Inventors: Kazuo Tsubuko; Shinichi Kuramoto, both of Numazu; Kazuhiko Umemura, Susono; Hidemi Uematsu, Fuji; Okawara, Makoto, Tokyo, all of Japan

[73] Assignee: Ricoh Company, Ltd., Tokyo, Japan

[21] Appl. No.: 844,908

[22] Filed: Mar. 4, 1992

Related U.S. Application Data

[63] Continuation of Ser. No. 646,415, Jan. 28, 1991, abandoned.

[30] Foreign Application Priority Data

Jan. 30, 1990 [JP] Japan ................................. 2-20224

[51] Int. Cl.⁵ .................. C08F 269/00; C08F 2/06; C08F 2/44
[52] U.S. Cl. .................. 525/112; 526/194; 526/201; 526/265; 526/273; 526/309; 526/318.41; 526/324; 526/325; 526/329.2; 526/329.6; 526/330; 524/731; 524/269; 524/489; 524/461; 525/254; 525/327.3; 525/329.7; 525/286; 525/529; 525/530; 525/531
[58] Field of Search ............... 526/194, 201; 524/269, 524/461, 731; 525/254, 112, 531

[56] References Cited

U.S. PATENT DOCUMENTS 2,472,589  6/1949  Hersberger .............. 526/194 X
3,898,300  8/1975  Hilliard .................. 526/194 X

FOREIGN PATENT DOCUMENTS 4017771  8/1965  Japan .
1024451  10/1981 Japan .
61-221211 10/1986 Japan .

Primary Examiner—Joseph L. Schofer
Assistant Examiner—M. Nagumo
Attorney, Agent, or Firm—Oblon, Spivak, McClelland, Maier & Neustadt

[57] ABSTRACT

A method for producing a vinyl resin comprising the steps of dissolving or dispersing a polymerizable vinyl monomer in a polymerization solvent containing a silicone oil, and polymerizing the polymerizable vinyl monomer in the presence of a polymerization catalyst.

15 Claims, No Drawings

METHOD FOR PRODUCING A VINYL RESIN USING A SILICON OIL SOLVENT

This application is a continuation of application Ser. No. 07/646,415, filed on Jan. 28, 1991, now abandoned.

BACKGROUND OF THE INVENTION

1. Field of the Invention

The present invention relates to a method for producing a non-aqueous vinyl resin using a silicone oil as a polymerization solvent, and more particularly to a method for producing a vinyl resin which is effective as a treatment for fiber, paper, and the surfaces of plastic and metal; printing ink; toner for electrophotography; coating compounds; and a material for a rubber roller and a coating resin thereof.

2. Discussion of Background

Various methods for producing vinyl resins are conventionally known, as disclosed in Japanese Patent Publications 40-19186, 45-14545 and 56-9189. In these conventional methods aromatic hydrocarbons such as toluene, xylene and benzene; esters; alcohols; and aliphatic hydrocarbons such as n-hexane, n-heptane, isooctane and isododecane and mixtures thereof are used as a solvent for polymerization.

The above-mentioned polymerization solvents have the advantages that they are cheap in cost, the solubility of resins therein are high and the volatility thereof is high.

However, they are disadvantageous from the hygienic viewpoint because they have odors and toxicity. Moreover, they have the problem of safety due to their low flash ignition temperature. In addition, since these solvents have a low boiling point, the polymerization temperature is limited. In particular, when the polymerization is carried out under application of heat using the aliphatic hydrocarbon-type solvent, the odor generated from the solvent becomes more and more strong as the solvent is oxidized in the polymerization reaction.

Furthermore, the conventional polymerization solvents are scarcely expected to increase the rate of polymerization of monomers, and to improve the characteristics of the obtained resin, such as water- and oil-repellency and the electrical insulating properties.

In addition to the above, when the aforementioned solvents are employed for preparation of the resin, a troublesome process is required to separate the obtained resin from the solvent at the final stage, for instance, by drying under application of heat, drying in a vacuum, or causing the resin to precipitate in a bad solvent. This is because the solubility of the resin in the aforementioned solvents is high.

SUMMARY OF THE INVENTION

Accordingly, an object of the present invention is to provide a method for producing a vinyl resin, free from the problems of hygiene and safety, capable of being carried out in a wide temperature range, increasing the rate of polymerization, improving the water- and oil-repellency and electrical insulating properties of the obtained resin, and facilitating the separation of the obtained resin from a solvent.

The above-mentioned object of the present invention can be achieved by a method for producing a vinyl resin which comprises the steps of dissolving or dispersing a polymerizable vinyl monomer in a polymerization solvent comprising a silicone oil and polymerizing the above monomer in the presence of a polymerization catalyst.

DESCRIPTION OF THE PREFERRED EMBODIMENTS

In the method for producing a vinyl resin according to the present invention, polymerizable vinyl monomers are graft-polymerized into other appropriate resins, or subjected to copolymerization in the presence of a crosslinking agent comprising a polyfunctional monomer such as a divinyl monomer. In any case, the polymerizable vinyl monomers which have been dissolved or dispersed in a solvent comprising a silicone oil are subjected to polymerization.

The polymerization solvent for use in the present invention comprises a silicone oil. The silicone oil for use in the present invention has not only good resistance to heat and acids, but also low viscosity, small temperature change and low surface tension. In addition, it is widely known that the silicone oil has excellent electrical insulating properties, water- and oil-repellency and anti-foaming characteristics. Thus, the silicone oil has different characteristics from those of synthetic solvents and natural oils such as mineral oils, animal oils and vegetable oils. Owing to such characteristics, the silicone oil is conventionally used as a moistureproof filler for a transformer, a capacitor, a transistor and other parts of an electronic apparatus; a heat transfer medium; a water- and oil-repellency agent; a releasing agent; and an antifoamer.

Although the silicone oil is utilized in a variety of fields, the application of the silicone oil to a solvent for polymerization is nevertheless proposed. The reasons for this is that the silicone oil itself is a kind of resin, and it is expensive.

According to the present invention, when the silicone oil is used as a polymerization solvent, the following advantages are found.

(1) The rate of polymerization is increased and the water- and oil-repellency and electrical insulating properties of obtained resins are improved.

This is because the purity of silicone oil is higher than other organic solvents, and therefore, radicals are not easily trapped in the silicone oil during polymerization.

In particular, improvement in the water- and oil-repellency and electrical insulating properties of obtained resins is also ascribed to the factor that part of silicone oil, which serves as a polymerization solvent, is substantially concerned in the polymerization reaction of vinyl monomers. For instance, when dialkyl silicone oil is used as the polymerization solvent, it works to subtract a hydrogen atom from an alkyl group in the polymerization.

(2) The polymerized resin can easily be separated from the polymerization solvent comprising silicone oil.

This is because the solubility of resins in silicone oil is low.

For example, when polylauryl methacrylate is prepared by polymerization using a solvent of silicone oil and separated therefrom, it does not become tacky and is provided with plasticity. On the other hand, when polylauryl methacrylate is prepared by polymerization using a solvent of toluene, it becomes tacky after separated from the solvent.

In the present invention the aforementioned silicone oil can be used together with other polymerization solvents as far as the advantages of the silicone oil are not impaired.

Examples of the silicone oil for use in the present invention include (i) a dialkyl silicone oil having the following formula (I); (ii) a cyclic polydialkyl siloxane or cyclic polyalkylphenyl siloxane; and (iii) an alkylphenyl siloxane. Moreover, a higher fatty acid-modified silicone oil, methyl chlorinated phenyl silicone oil, an alkylmodified silicone oil, a methylhydrogen silicone oil, an amino-modified silicone oil and an epoxy-modified silicone oil can also be used.

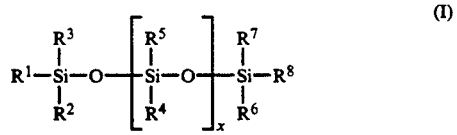

(I)

wherein $R^1$, $R^2$, $R^3$, $R^4$, $R^5$, $R^6$, $R^7$ and $R^8$ independently represent $-C_nH_{2n+1}$, in which n is an integer of 1 to 20; and x is an integer of 0 or more.

Particularly, when the above dialkyl silicone oils of formula (I) are used as polymerization solvents in the present invention, the temperature for polymerization can freely be controlled. Of these dialkyl silicone oils, dimethyl polysiloxane is preferable. Furthermore, the dialkyl silicone oils of formula (I) with a viscosity of 0.01 to 1,000,000 cs (centistokes) at 25° C. are preferable. In addition, it is preferable that x in formula (I) be in the range of 1 to 20,000.

When the cyclic polydialkyl siloxane or cyclic polyalkylphenyl siloxane is used as a solvent in the polymerization, the resin to be obtained has the drying characteristics. Therefore, the film performance of the resin is improved and the surface thereof becomes glossy.

When the alkylphenyl siloxane is used as a polymerization solvent, the solubility of resins in such a solvent is increased because a phenyl group is introduced into the solvent in a ratio of 5 to 50 mol%, thereby increasing the dispersion stability of the obtained resin dispersion. In particular, a methylphenyl siloxane is preferably used.

Specific examples of each of the aforementioned silicone oils are as follows.

(i) Dialkyl silicone oil

TABLE 1

|  | Viscosity (cs) |
| --- | --- |
| Dimethyl silicone oil | 0.65, 1.0, 1.5, 10500, 500000 |
| Diethyl silicone oil | 1.5, 5, 200, 3000 |
| Dibutyl silicone oil | 3, 15, 500, 60000 |
| Dihexyl silicone oil | 12, 25, 8000 |
| Dilauryl silicone oil | 30, 1000, 60000 |
| Distearyl silicone oil | 100, 2000 |

(ii) Cyclic polydialkyl siloxane and cyclic polyalkylphenyl siloxane (Each cyclic polyalkylphenyl siloxane contains a phenyl group in the ratio of 5, 10, 20 and 50 mol.%.)

Cyclic polydimethyl siloxane
　Cyclic polymethylphenyl siloxane
Cyclic polydiethyl siloxane
　Cyclic polyethylphenyl siloxane
Cyclic polydibutyl siloxane
　Cyclic polybutylphenyl siloxane
Cyclic polydihexyl siloxane
　Cyclic polyhexylphenyl siloxane
Cyclic polydilauryl siloxane
　Cyclic polymethylchlorophenyl siloxane
Cyclic polydistearyl siloxane
　Cyclic polymethylbromophenyl siloxane (iii) Alkylphenyl

TABLE 2

|  | Content of Phenyl Group (mol. %) |
| --- | --- |
| Methylphenyl siloxane | 5, 10, 20, 50 |
| Ethylphenyl siloxane | 5, 10, 20, 50 |
| Propylphenyl siloxane | 5, 10, 20, 50 |
| Butylphenyl siloxane | 5, 10, 20, 50 |
| Hexylphenyl siloxane | 5, 10, 20, 50 |
| Octylphenyl siloxane | 5, 10, 20, 50 |
| Laurylphenyl siloxane | 5, 10, 20, 50 |
| Stearylphenyl siloxane | 5, 10, 20, 50 |

Examples of the commercially available products of the above silicone oils are "KF-96L" (0.65, 1.0, 1.5, 2.0 cs), "KF-96" (10, 20, 30, 50, 500, 1000, 3000 cs), "KF-56", "KF-58" and "KF-54" (Trademark), made by Shin-Etsu Chemical Co., Ltd; "TSF451", "TSF456", "TSF410", "TSF411", "TSF440", "TSF4420", "TSF484", "TSF483", "TSF431", "TSF433", "THF450", "TSF404", "TSF405", "TSF406", "TSF451-5A", "TSF451-10A", "TSF437", "TSF4440", "TSF400", "TSF401", "TSF4300", "TSF4445", "TSF4700", "TSF4450", "TSF4702", "TSF4730", "TSF434" and "TSF4600" (Trademark), made by Toshiba Silicone Co., Ltd.; and "HS-200" (Trademark), made by Toray Silicone Co., Ltd.

As previously mentioned, the above silicone oils can be used in combination with other solvents. Examples of such solvents which can be used with the silicone oils are aromatic hydrocarbon solvents such as toluene, xylene and benzene; ethers; esters; alcohol-based solvents; and aliphatic hydrocarbon solvents such as n-hexane, n-octane, iso-octane and iso-dodecane and mixtures thereof. As the commercially available aliphatic hydrocarbon solvents, "Isopar H", "Isopar G", "Isopar L" and "Isopar V" (Trademark), made by Exxon Chemical Japan Ltd., are well known.

It is preferable that the amount of the above solvent be about 0.1 to 500 parts by weight to 100 parts by weight of the silicone oil.

Specific examples of the polymerizable vinyl monomer for use in the present invention are as follows.

For the polymerizable vinyl monomer which is singly polymerized or subjected to copolymerization with other monomers including a crosslinking agent, the following monomers can be employed: p-methylstyrene, α-methylstyrene, 2,5-dichlorostyrene, α-vinylpyridine, acrylonitrile, vinyl acetate, vinylmethyl ether, vinylethyl ether, vinylisobutyl ether, vinyl chloride, vinylcarbazole, vinylpyrrolidone, vinylpyridine, vinylformal, vinylacetoacetal, vinylpropional, vinylbutyral, vinylhexyral, vinyl alcohol, methyl acrylate, methyl methacrylate, ethyl acrylate, ethyl methacrylate, n-butyl acrylate, n-butyl methacrylate, iso-butyl acrylate, n-octyl methacrylate, lauryl methacrylate, stearyl methacrylate, methacrylic acid, acrylic acid, sodium methacrylate, sodium acrylate, divinyl benzene, styrene, ethylene glycol dimethacrylate and triethylene glycol triacrylate.

In the case where the polymerizable vinyl monomer is subjected to copolymerization, the following combinations are employed in the present invention.

(1) The combination of Monomer A of formula (II), Monomer B of formula (III) and Monomer C having a carboxyl group or a glycidyl group, as disclosed in Japanese Laid-Open Patent Application 62-18410;

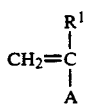

(II)

wherein $R^1$ represents —H or —$CH_3$; and A represents —$COOC_nH_{2n+1}$ or —$OCOC_nH_{2n+1}$, in which n is an integer of 6 to 20,

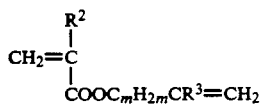

(III)

wherein $R^2$ and $R^3$ each represent —H or —$CH_3$; and m is an integer of 1 to 20.

(2) The combination of the aforementioned Monomer A and a polyfunctional acrylic acid ester and/or a polyfunctional methacrylic acid ester, as disclosed in Japanese Laid-Open Patent Application 56-79111.

(3) The combination of the aforementioned Monomer A and divinyl benzene or an alkyl derivative thereof having 1 to 20 carbon atoms, as disclosed in Japanese Laid-Open Patent Application 56-145911.

(4) The combination of the aforementioned Monomer A, Monomer D of formula (IV) and Monomer C having a carboxyl group or a glycidyl group, as disclosed in Japanese Laid-Open Patent Application 62-18410;

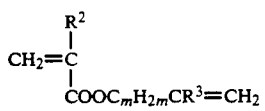

(IV)

wherein $R^2$ and $R^3$ each represent —H or —$CH_3$; and m is an integer of 1 to 20.

(5) The combination of the aforementioned Monomer A and Monomer E of formula (V), as disclosed in Japanese Laid-Open Patent Application 59-98114;

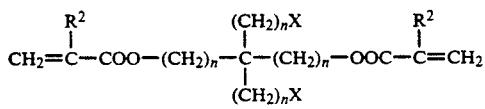

(V)

wherein $R^2$ represents —H or —$CH_3$; X represents a halogen; and n is an integer of 1 to 20.

(6) The combination of the aforementioned Monomer A and Monomer F of formula (VI), as disclosed in Japanese Laid-Open Patent Application 60-248711;

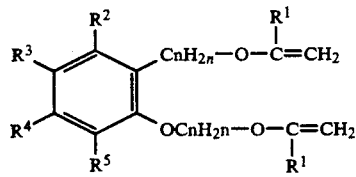

(VI)

wherein $R^1$ represents —H or —$CH_3$; $R^2$, $R^3$, $R^4$ and $R^5$ each represent a halogen, —H, —COOH, —OH or an alkyl group having 1 to 4 carbon atoms; and n is an integer of 1 to 20.

(7) The combination of the aforementioned Monomer A and Monomer G of formula (VII), as disclosed in Japanese Laid-Open Patent Application 60-226512;

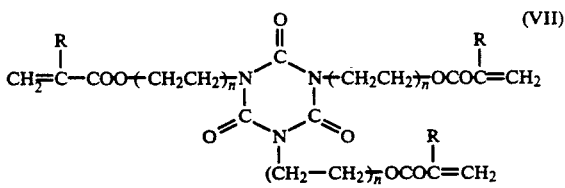

(VII)

wherein R represents —H or —$CH_3$; and n is an integer of 1 to 20.

(8) The combination of the aforementioned Monomer A and Monomer H of formula (VIII), as disclosed in Japanese Laid-Open Patent Application 60-248718;

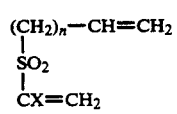

(VIII)

wherein X represents —H, —$CH_3$ or a halogen; and n is an integer of 1 to 10.

(9) The combination of the aforementioned Monomer A and Monomer I of formula (IX), as disclosed in Japanese Laid-Open Patent Application 60-248712;

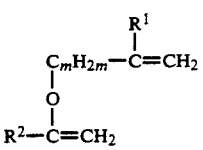

(IX)

wherein $R^1$ and $R^2$ each represent —H or —$CH_3$; and m is an integer of 1 to 20.

(10) The combination of Monomer A' of formula (II') and Monomer J of formula (X), as disclosed in Japanese Laid-Open Patent Application 57-172905;

(II')

wherein R represents —H or —$CH_3$; and A' represents —$COOC_nH_{2n+1}$, —$OCOC_nH_{2n+1}$, in which n is an integer of 6 to 20, 2-ethylhexyl carbonate or a cyclohexylcarbonate group.

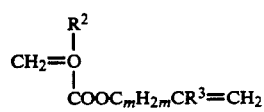

(X)

wherein $R^2$ and $R^3$ each represent —H or —$CH_3$; and m is an integer of 1 to 20.

In the present invention, any conventional polymerization initiators can be used. For instance, benzoyl peroxide, lauryl peroxide, di-t-butyl peroxide, cumene hydroperoxide, hydrogen peroxide, ammonium persulfate, potassium persulfate and azobisisobutyronitrile can be used. Moreover, polymerization promotors such as dimethylaniline, pyridine, cobalt naphthenate and manganese naphthenate can be used together with the above polymerization initiators.

When the resin is prepared according to the present invention, it is preferable that the mixing ratio of the polymerization solvent comprising the above-mentioned silicone oil to the polymerizable vinyl monomer to the polymerization initiator be about (10 to 90) : (10 to 90) : (0.001 to 5).

Furthermore, finely-divided particles of silica, and waxes or polyolefins having a softening point of about 60 to 130° C. may be added to the polymerization system.

When the finely-divided particles of silica ar added to the polymerization system, these particles are trapped in the crosslinked structure, that is a net structure, of the obtained resin. As a matter of course, silica itself is not subject to the physical changes during the polymerization reaction. Namely, silica is never dissolved in the polymerization solvent. When the dispersing medium comprises an aliphatic hydrocarbon solvent, silica can contribute to the dispersion stability of the obtained resin dispersion because silica can prevent the resin from causing gelation and the specific gravity of silica is approximate to that of the dispersing medium.

When the waxes and polyolefins are employed, they are dissolved in the reaction system under application of heat thereto in the course of the polymerization reaction. After the completion of the reaction, the waxes and polyolefins dissolved in the dispersing medium are separated out in the form of finely-divided particles as the reaction system is cooled. As a result, the resin is obtained with adsorbed by the finely-divided particles of waxes and polyolefins. The resin can be prevented from causing gelation because the specific gravity of the waxes and polyolefins is approximate to that of the dispersing medium. The molecular structure of the waxes and polyolefins is similar to that of the dispersing medium, so that they can also contribute to the dispersion stability. In addition to the above, the waxes and polyolefins for use in the present invention have a low softening point, the adhesiveness is increased.

It is preferable that the amount of the aforementioned silica particles, waxes and polyolefins be in the range of about 5 to 50 parts by weight of 100 parts by weight of the obtained resin.

Specific examples of the commercially available products of the above waxes and polyolefins with a softening point ranging from 60° to 130° C. are as follows.

Examples of Polyethylene

| Manufacturer | Trademark | Softening Point (° C) |
|---|---|---|
| Union Carbide K.K. (U.S.A.) | DYNI | 102 |
| | DYNF | 102 |
| | DYNH | 102 |
| | DYNJ | 102 |
| | DYNK | 102 |
| Monsant Co. (U.S.A.) | Orlizon 805 | 116 |
| | Orlizon 705 | 116 |
| | Orlizon 50 | 126 |
| Phillips Petroleum Co. (U.S.A.) | Marlex 1005 | 92 |
| Du Pont de Nemours, E.I. & Co. | Alathon 3 | 103 |
| | Alathon 10 | 96 |
| | Alathon 12 | 84 |
| | Alathon 14 | 80 |
| | Alathon 16 | 95 |
| | Alathon 20 | 86 |

-continued

| Manufacturer | Trademark | Softening Point (° C) |
|---|---|---|
| | Alathon 22 | 84 |
| | Alathon 25 | 96 |
| Allied Chemical Corp. (U.S.A.) | AC-Polyethylene 1702 | 98 |
| | AC-Polyethylene 6 & 6A | 102 |
| | AC-Polyethylene 615 | 105 |
| Sanyo Chemical Industries, Ltd. | Sanwax 131-P | 108 |
| | Sanwax 151-P | 107 |
| | Sanwax 161-P | 111 |
| | Sanwax 165-P | 107 |
| | Sanwax 171-P | 105 |
| | Sanwax E-200 | 95 |
| Junsei Chemical Co., Ltd. | Paraffin wax | 60 to 98 |
| Kobayashi Chemical Co., Ltd. | Purified bees wax | 65 |
| Nagai Chemical Co., Ltd. | Purified bees wax | 65 |
| Sumitomo Seika Chemicals Co., Ltd | Flothene | 110 |
| Du Pont-Mitsui Polychemicals Co., Ltd. | Evaflex 210 | 80 to 95 |
| | Nucrel N | 100 to 110 |

For the polymerizable vinyl monomers which are grafted into an appropriate resin, the following combinations are employed in the present invention.

(1) An epoxy resin with an epoxy equivalent of 50 to 5000 and the aforementioned Monomer A represented by formula (II) in which the above epoxy resin can be dissolved are subjected to graft-polymerization, as disclosed in Japanese Patent Publication 56-50893.

For the above-mentioned epoxy resin, any synthetic resins which are only slightly soluble or insoluble in a non-aqueous solvent with a solubility parameter of 8.5 or less and have an epoxy equivalent of 50 to 5000 can be employed in the present invention.

Specific examples of the commercially available products of the above epoxy resin (which are all made by Yuka Shell Epoxy. K.K.) are given in Table 3.

TABLE 3

| Trademark | Melting Point (°C.) | Epoxy Equivalent | Molecular Weight |
|---|---|---|---|
| Epicote 1001 | 65 to 75 | 425 to 550 | 875 |
| Epicote 1004 | 95 to 105 | 875 to 1025 | 1350 |
| Epicote 1007 | 125 to 135 | 1900 to 2450 | 2625 |
| Epicote 1009 | 145 to 155 | 2400 to 4000 | 3875 |
| Epicote 815 | — | 190 | — |

(2) A copolymer of the Monomer A of formula (II) and a monomer of formula (XI) is first subjected to esterification, using a monomer having formula (XII), and then the polymerizable vinyl monomer is grafted into the esterified copolymer, as disclosed in Japanese Patent Publications 53-7952 and 56-9189;

(XI)

wherein $R^1$ represents —H or —$CH_3$; and A″ represents —COOH or

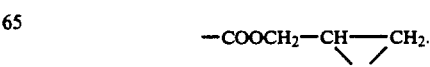

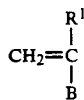 (XII)

wherein R¹ represents —H or —CH₃; and B represents —COOH or $$-COOCH_2-CH\underset{O}{\overset{}{—}}CH_2,$$

provided that B represents glycidyl methacrylate or glycidyl acrylate when the monomer A of formula (II) or the monomer having formula (XI) has an acrylic acid or methacrylic acid, and that B represents an acrylic acid or methacrylic acid when the monomer A of formula (II) or the monomer having formula (XI) has glycidyl methacrylate or glycidyl acrylate.

(3) As disclosed in Japanese Laid-Open Patent Application 51-19085;

(i) The aforementioned Monomer A of formula (II) and an unsaturated carboxylic acid or glycidyl (meth)acrylate are subjected to copolymerization.

(ii) The above-prepared copolymer is esterified using glycidyl (meth)acrylate when the copolymer comprises a monomer of unsaturated carboxylic acid. When the copolymer comprises a monomer of glycidyl (meth)acrylate, esterification is carried out using the unsaturated carboxylic acid.

(iii) A polymerizable vinyl monomer such as acrylic acid, methacrylic acid, a lower alkyl ester of acrylic acid or methacrylic acid (having 1 to 4 carbon atoms), styrene, methylstyrene, vinyltoluene and vinyl acetate is grafted into the above esterified copolymer.

(iv) The graft-copolymer thus obtained and at least one selected from polar compounds such as a vinyl monomer of formula (XIII), maleic acid, fumaric acid, atropic acid, allylamine, vinylamine, aroyl alcohol, vinylsulfonic acid and vinylphosphoric acid, are subjected to polymerization;

 (XIII)

wherein R¹ represents —H or —CH₃; and B' represents

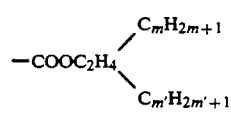

(in which $1 \leq m \leq 4$ and $1 \leq m' \leq 4$), —COOH, —COOC₂H₄OH, $$-COOCH_2-CH\underset{O}{\overset{}{—}}CH_2, -\!\!\bigcirc\!\!-R'$$

[in which R' represents —Cl, —NO₂, —COOH, —N(CH₃)₂, —OH or —NH₂],

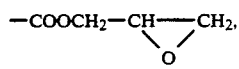

(4) As disclosed in Japanese Laid-Open Patent Application 55-90521;

(i) The aforementioned Monomer A of formula (II) and Monomer K having a glycidyl group or Vinyl Monomer L having an aromatic carboxylic acid are subjected to copolymerization.

(ii) The above-prepared copolymer is esterified using the Monomer L when the copolymer comprises the Monomer K. When the copolymer comprises the Monomer L, esterification is carried out using the Monomer K.

(iii) Monomer M selected from the group consisting of a compound having formula (XIV), styrene, vinyl acetate, vinyltoluene and chlorostyrene is grafted into the above esterified copolymer.

$$\overset{R^1}{\underset{}{CH_2=C-Z}}$$ (XIV)

wherein R¹ represents —H or —CH₃; and Z represents —COOCO$_m$H$_{2m+1}$ in which m is an integer of 1 to 4, —OCOC$_{m'}$H$_{2m'+1}$ in which m' is an integer of 1 to 6, $$-COOC_2H_4\!\!\begin{array}{c}\diagup C_mH_{2m+1}\\ \diagdown C_{m'}H_{2m'+1}\end{array}$$

(in which $1 \leq m \leq 4$ and $1 \leq m' \leq 6$), —COOH, —COOC₂H₄OH, $$-COOCH_2-CH\underset{O}{\overset{}{—}}CH_2, -\!\!\bigcirc\!\!-R'$$

(5) As disclosed in Japanese Laid-Open Patent Application 50-98592;

(i) The aforementioned Monomer A of formula (II) and a monomer having formula (XV) are subjected to copolymerization.

$$\overset{R}{\underset{A''}{CH_2=C}}$$ (XV)

wherein R represents —H or —CH₃; and A" represents —COOH or $$-COOCH_2-CH\underset{O}{\overset{}{—}}CH_2.$$

(ii) The above-prepared copolymer is esterified using a monomer having formula (XVI).

wherein R represents —H or —CH$_3$; and B" represents —COOH or

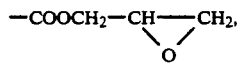

provided that B" represents glycidyl methacrylate or glycidyl acrylate when the monomer A of formula (II) or the monomer having formula (XV) has an acrylic acid or methacrylic acid, and that B" represents an acrylic acid or methacrylic acid when the monomer A of formula (II) or the monomer having formula (XV) has glycidyl methacrylate or glycidyl acrylate.

(iii) A polymerizable vinyl monomer such as acrylic acid, methacrylic acid, a lower alkyl ester of acrylic acid or methacrylic acid (having 1 to 4 carbon atoms), styrene, vinyltoluene and vinyl acetate is grafted into the above esterified copolymer.

Examples of polymerization catalysts for use in the present invention include azobisisobutyronitrile (AIBN), benzoyl peroxide (BPO), phenylazotriphenylmethane, lauryl peroxide, di-t-butyl peroxide, t-butyl peroxide and cumene hydroperoxide.

To prepare a coating compound, a liquid developer or toner for electrophotography and a printing ink using the resin or resin dispersion which is obtained according to the method of present invention, a coloring agent and other resins may be added to the above-mentioned resin or resin dispersion.

For instance, to prepare a developer for electrophotography, dyes and pigments such as carbon black, Oil Blue, Alkali Blue, Phthalocyanine Blue, Phthalocyanine Green, Spirit Black, Aniline Black, Oil Violet, Benzidine Yellow, Methyl Orange, Brilliant Carmine, Fast Red and Crystal Violet can be used as the coloring agent. For the resins which can be added to the above-mentioned resin or resin dispersion, acrylic resin, ester gum, natural resins such as hardened rosin, natural-resin-modified maleic acid resin, phenolic resin, polyester and pentaerythritol resin can be employed.

Other features of this invention will become apparent in the course of the following description of exemplary embodiments, which are given for illustration of the invention and are not intended to be limiting thereof.

EXAMPLES 1 TO 3 AND COMPARATIVE EXAMPLE 1

In a container equipped with a stirrer, a thermometer and a reflux condenser, 300 g of the polymerization solvent shown in Table 4 was separately placed and heated to 95° C.

A mixture of 150 g of 2-ethylhexyl methacrylate, 50 g of glycidyl methacrylate and 3 g of azobisisobutyronitrile was added dropwise to the above polymerization solvent over a period of one hour. After the completion of dropping, the polymerization reaction was carried out over a period of 4 hours with the temperature of the reaction mixture maintained at 95° C.

The thus obtained resin was reprecipitated with methanol, and purified by repeating an operation of dissolving the resin in toluene three times.

The water- and oil-repellency and electrical resistivity of the resultant resins were measured by the following method. The rate of polymerization was also obtained in accordance with the following formula. The results are shown in Table 4.

Evaluation Items (A) Water-repellency: The contact angle of the resin surface to ion exchange water was measured with a commercially available contact angle measuring apparatus made by Kyowa Kagaku Corp.

(B) Oil-repellency: The contact angle of the resin surface to iso-dodecane was measured with the same measuring apparatus as in the above.

(C) Electrical resistivity: measured with a commercially available ammeter, made by Yokogawa Electric Works, Ltd.

(D) Rate of polymerization (%) = $\frac{\text{Solid content of resin}}{\text{Theoretically charged solid content}} \times 100$

TABLE 4

| | Polymerization Solvent | A (°) | B (°) | C (Ω · cm) | D (%) |
|---|---|---|---|---|---|
| Comp. Ex. 1 | Toluene | 14.0 | 9.6 | 2 × 10$^{11}$ | 85.1 |
| Ex. 1 | Dimethylsilicone oil (viscosity:1.5 cSt) | 26.3 | 21.4 | 8 × 10$^{13}$ | 93.8 |
| Ex. 2 | Cyclic polydimethyl siloxane | 27.4 | 22.2 | 7.2 × 10$^{13}$ | 93.1 |
| Ex. 3 | Methyl phenyl silicone oil (content of phenyl group:10 mol %) | 27.2 | 22.0 | 7 × 10$^{13}$ | 92.9 |

EXAMPLES 4 TO 6 AND COMPARATIVE EXAMPLE 2

In the same container as used in Example 1, 300 g of the polymerization solvent shown in Table 5 was separately placed and heated to 85° C.

A mixture of 300 g of styrene and 3 g of benzoyl peroxide was added dropwise to the above polymerization solvent over a period of one hour. After the completion of dropping, the polymerization reaction was carried out over a period of 3 hours with the temperature of the reaction mixture maintained at 85° C.

The thus obtained resin was purified by the same method as in Example 1.

The water- and oil-repellency and electrical resistivity of the resultant resins were measured by the same method as in Example 1. In addition, odor of the polymerized resin was evaluated by the organoleptic test. The results are shown in Table 5.

Evaluation Item (E) Odor: Presence or absence of the odor generated from each polymerized resin was evaluated by the organoleptic test.

TABLE 5

| | Polymerization Solvent | A (°) | B (°) | C (Ω · cm) | D (%) | E |
|---|---|---|---|---|---|---|
| Comp. Ex. 2 | iso-dodecane | 10.8 | 10.1 | 8 × 10$^{12}$ | 88.5 | Presence |

TABLE 5-continued

| | Polymerization Solvent | A (°) | B (°) | C (Ω·cm) | D (%) | E |
|---|---|---|---|---|---|---|
| Ex. 4 | Diethylsilicone oil (viscosity: 200 cSt) | 25.6 | 20.4 | $8.9 \times 10^{13}$ | 94.2 | Absence |
| Ex. 5 | Cyclic polydiethyl siloxane | 25.6 | 22.0 | $8.5 \times 10^{13}$ | 94.6 | Absence |
| Ex. 6 | Dipropylphenyl silicone oil (content of phenyl group: 10 mol %) | 25.7 | 21.0 | $8.0 \times 10^{13}$ | 94.4 | Absence |

A: Water-repellency
B: Oil-repellency
C: Electrical resistivity
D: Rate of polymerization
E: Odor

EXAMPLES 7 TO 9 AND COMPARATIVE EXAMPLE 3

In the same container as used in Example 1, 300 g of the polymerization solvent shown in Table 6 was separately placed and heated to 130° C.

A mixture of 300 g of lauryl methacrylate and 5 g of lauryl peroxide was added dropwise to the above polymerization solvent over a period of one hour. After the completion of dropping, the polymerization reaction was carried out over a period of 2 hours with the temperature of the reaction mixture maintained at 130° C.

The thus obtained resin was purified by the same method as in Example 1.

The water- and oil-repellency, electrical resistivity and odor of the resultant resins were measured by the same method as in the above. In addition, it was observed whether the polymerized resin was easily separated from the solvent. The results are shown in Table 6.

Evaluation Item (F) Separation of the resin from the polymerization solvent:

o—The polymerized resin was easily separated from the solvent, and this resin did not become tacky.
x—The polymerized resin was not easily separated from the solvent.

TABLE 6

| | Polymerization Solvent | A (°) | B (°) | D (%) | E | F |
|---|---|---|---|---|---|---|
| Comp. Ex. 3 | Isopar L | 18 | 16 | 92.1 | faint odor | X |
| Ex. 7 | Dilauryl silicone oil (viscosity:30 cSt) | 26 | 20 | 93.8 | Absence | o |
| Ex. 8 | Cyclic polymethylphenyl siloxane (content of phenyl group: 10 mol %) | 26.2 | 21.0 | 94.0 | Absence | o |
| Ex. 9 | Hexylphenyl silicone oil (content of phenyl group: 50 mol %) | 26 | 21 | 93.9 | Absence | o |

A: Water-repellency
B: Oil-repellency
D: Rate of polymerization
E: Odor
F: Separation of the resin from the solvent Furthermore, evaluation of the drying characteristics of the polymerized resins and the dispersion stability of the resin dispersions was made, using the polymerized resins obtained in Example 8 and Comparative Example 3.

The results are given in Table 7.

TABLE 7

| | G | H (min.) |
|---|---|---|
| Comp. Ex. 3 | Sedimentation was observed. | 30 or more |
| Ex. 8 | No sedimentation | 10 or less |

Evaluation Items (G) Dispersion stability of the resin dispersion: After the resin dispersion was stored at 50° C. for one month, sedimentation of the resin component was observed.

(H) Drying characteristics of the resin: The resin dispersion was coated in a thickness of 10 μm on an aluminum sheet and dried at 50° C. The drying characteristics were expressed by the time required till the resin became dry.

EXAMPLES 10 TO 12 AND COMPARATIVE EXAMPLE 4

In the same container as used in Example 1, 250 g of the polymerization solvent shown in Table 8 and 50 g of "Isopar H" (Trademark), made by Exxon Chemical Japan Ltd., were separately placed and heated to 90° C.

A mixture of 100 g of methylstyrene, 15 g of methacrylic acid and 10 g of azobisisobutyronitrile was added dropwise to the above polymerization solvent over a period of 2 hours. After the completion of dropping, the polymerization reaction was carried out over a period of 4 hours with the temperature of the reaction mixture maintained at 90° C.

The thus obtained resin was purified by the same method as in Example 1.

The water- and oil-repellency, and electrical resistivity of the resultant resins were measured by the same method as in the above. In addition, it was observed whether the polymerized resin was easily separated from the polymerization solvent. Furthermore, the film properties of the resin dispersions obtained in Example 11 and Comparative Example 4 were evaluated by the following method. The results are shown in Table 8.

Evaluation Item (I) Film properties: After the resin dispersion was coated on an aluminum sheet and dried at 50° C. for one hour to form a film, the surface gloss on the film was visually inspected.

TABLE 8

| | Polymerization Solvent | A (°) | B (°) | D (%) | F | I (Surface Gloss) |
|---|---|---|---|---|---|---|
| Comp. Ex. 4 | Isopar H | 12.1 | 14.0 | 90.8 | X | Absence |
| Ex. 10 | Dimethylsilicone oil (viscosity:1.5 cSt) | 20.3 | 22.0 | 95.2 | o | — |
| Ex. 11 | Cyclic polydibutyl siloxane | 25.0 | 25.3 | 95.0 | o | Presence |
| Ex. 12 | Laurylphenyl silicone oil (content of phenyl | 25.9 | 23.0 | 95.3 | o | — |

TABLE 8-continued

| Polymerization Solvent | A (°) | B (°) | D (%) | F | I (Surface Gloss) |
|---|---|---|---|---|---|
| group:10 mol %) | | | | | |

A: Water-repellency
B: Oil-repellency
D: Rate of polymerization
F: Separation of the resin from the solvent
I: Film properties

EXAMPLE 13

In a flask with four side arms equipped with a stirrer, a condenser, a thermometer and a dropping funnel, 300 g of a commercially available silicone oil "KF96L" (Trademark) with a viscosity of 1 cs, made by Shin-Etsu Chemical Co., Ltd., serving as a polymerization solvent, was placed and heated to 90° C.

A mixture of 90 g of 2-ethylhexyl methacrylate, 30 g of a commercially available epoxy resin "Epicote 1001" (Trademark), made by Yuka Shell Epoxy, K.K., 10 g of maleic acid and 3 g of azobisisobutyronitrile was added dropwise to the above polymerization solvent over a period of one hour to carry out the polymerization reaction. After 30 minutes, the reaction mixture became white-opaque.

Thereafter, the polymerization reaction was continued for 6 hours at 90° C., with the addition of 1.0 g of diethylamine to the reaction mixture, whereby a resin dispersion was obtained. The rate of polymerization was 98.9%.

The thus obtained resin dispersion was separately stored at 50° C., 20° C. and 0° C. for 30 days. In any case, there was no coalescence of the above components nor separation of layers in the resin dispersion.

The water-repellency and oil-repellency of the resultant resin were excellent.

EXAMPLE 14

A mixture of the following components was placed in a flask and subjected to polymerization at 90° C. over a period of 4 hours.

| | Amount |
|---|---|
| Silicone oil "KF-54" (Trademark) made by Shin-Etsu Chemical Co., Ltd. | 100 g |
| Cyclic aliphatic ester type epoxy resin "Epiclone" (Trademark) made by Dainippon Ink & Chemicals, Inc. | 50 g |
| Lauryl methacrylate | 60 g |
| Acrylic acid | 20 g |
| Azobisisobutyronitrile | 3 g |
| "Paraffin wax" (Trademark) made by Junsei Chemical Co., Ltd. (softening point: 82° C.) | 30 g |

Thereafter, the polymerization reaction was continued for 2 hours with the addition of 1 g of azobisisobutyronitrile to the reaction mixture, whereby a resin dispersion was obtained. The rate of polymerization was 98.9%.

After the resin dispersion thus obtained was stored at 50° C. for one month, there was no change.

EXAMPLE 15

A mixture of the following components was placed in a flask and subjected to polymerization at 95° C. over a period of 4 hours.

| | Amount |
|---|---|
| Silicone oil "HS-200" (Trademark) made by Toray Silicone Co., Ltd. | 100 g |
| Isooctane | 150 g |
| Lauryl methacrylate | 20 g |
| Cetyl methacrylate | 25 g |
| Epoxy resin "Epotohto YD-115" (Trademark) made by Tohto Kasei Co., Ltd. | 10 g |
| Fumaric acid | 10 g |
| Benzoyl peroxide | 2 g |

Thereafter, 300 g of isooctane was further added to the reaction mixture, whereby a resin dispersion was obtained. The rate of polymerization was 97.8%.

After the resin dispersion thus obtained was stored at 50° C. for one month, there was no change.

EXAMPLE 16

A mixture of the following components was placed in a flask and subjected to polymerization at 90° C. over a period of 2 hours.

| | Amount |
|---|---|
| Stearyl methacrylate | 100 g |
| Methyl methacrylate | 30 g |
| Epoxy resin "Chissonox CX-206" (Trademark) made by Chisso Corporation | 15 g |
| Acrylic acid | 20 g |
| "Polyethylene AC 6 & 6A" (Trademark) made by Allied Chemical Corp. | 50 g |
| Silicone oil "KF-58" (Trademark) made by Shin-Etsu Chemical Co., Ltd. | 150 g |
| Azobisisobutyronitrile | 5 g |

Thereafter, 3 g of azobisisobutyronitrile and 300 g of the silicone oil "KF-58" (Trademark), made by Shin-Etsu Chemical Co., Ltd., were further added to the reaction mixture to carry out the polymerization over a period of 4 hours with the temperature of the reaction mixture maintained at 90° C. After the completion of polymerization, the reaction mixture was cooled, whereby a resin dispersion was obtained. The rate of polymerization was 98.5%.

The resin dispersion thus obtained was separately stored at 0° C., 20° C. and 50° C. for one month. In any case, there was no sedimentation and coalescence of the above components, nor separation of layers in the resin dispersion.

Preparation of Composition of Adhesive Agent

EXAMPLE 18

In a container equipped with a stirrer, a thermometer and a reflux condenser, 300 g of a commercially available silicone oil "KF-96L" (Trademark) with a viscosity of 0.65 cs, made by Shin-Etsu Chemical Co., Ltd., serving as a polymerization solvent, was placed and heated to 95° C.

A mixture of 150 g of 2-ethylhexyl methacrylate, 50 g of glycidyl methacrylate and 3 g of azobisisobutyronitrile was added dropwise to the above polymerization solvent at a constant speed over a period of 3 hours, followed by stirring for one hour. Thus, a copolymer was obtained.

Thereafter, 15 g of acrylic acid, 0.1 g of hydroquinone and 1 g of lauryl dimethylamine were added to the above copolymer, and the reaction was carried out at 90° C. for 15 hours. Thus, the above copolymer was esterified. It was confirmed by measurement of the decrease in the acid number that the degree of esterification was in the range of 25 to 30%.

To the above esterified reaction mixture, 500 g of the commercially available silicone oil "KF-96L" (Trademark) with a viscosity of 0.65 cs, made by Shin-Etsu Chemical Co., Ltd., was added, and a mixture of 50 g of methyl methacrylate and 3 g of azobisisobutyronitrile was further added dropwise thereto at a constant speed over a period of 3 hours with the temperature of the reaction mixture maintained at 90° C. After the completion of dropping, the temperature of the reaction mixture was maintained at 90° C. for another 5 hours.

Sequentially, 300 g of the commercially available silicone oil "KF-96L" (Trademark) with a viscosity of 0.65 cs, made by Shin-Etsu Chemical Co., Ltd., was added to 300 g of the above reaction mixture and heated to 90° C. To the above reaction mixture, 50 g of a commercially available polyethylene "Orlizon 805" (Trademark), made by Monsanto Co. (U.S.A) was added and dissolved therein under application of heat for one hour until the reaction mixture became transparent. The thus obtained resin solution was cooled using tap water, with stirring, whereby a resin dispersion (a composition of an adhesive agent) was prepared.

The viscosity, the dispersion stability, the adhesion strength and the water-repellency of the obtained resin dispersion were measured. The results are given in Table 9.

EXAMPLE 19

In the same container as used in Example 18, 400 g of a commercially available silicone oil "HS-200" (Trademark), made by Toray Silicone Co., Ltd., serving as a polymerization solvent, was placed and heated to 95° C.

A mixture of 150 g of stearyl methacrylate, 30 g of glycidyl acrylate and 2 g of benzoyl peroxide was added dropwise to the above polymerization solvent at a constant speed over a period of one hour, followed by stirring for 3 hours at 95° C. to complete the reaction. Thus, a copolymer was obtained.

Sequentially, 1 g of lauryl dimethylamine, 15 g of methacrylic acid and 0.1 g of hydroquinone were added to the above copolymer, and the reaction was carried out at 95° C. for 10 hours. Thus, the above copolymer was esterified. It was confirmed by measurement of the decrease in the acid number that the degree of esterification was 30%.

To the above esterified reaction mixture, 600 g of isooctane was added, and a mixture of 60 g of styrene and 4 g of benzoyl peroxide was further added dropwise thereto over a period of 3 hours with the temperature of the reaction mixture maintained at 95° C. After the completion of dropping, the reaction was continued at 95° C. for another 5 hours.

Thereafter, 200 g of the commercially available silicone oil "HS-200" (Trademark), made by Toray Silicone Co., Ltd., was added to the above reaction mixture. To the above reaction mixture, 50 g of a commercially available polyethylene "DYNI" (Trademark), made by Union Carbide (U.S.A) was added and dissolved therein at 95° C., followed by further stirring for 40 minutes and cooling. Thus, a resin dispersion (a composition of an adhesive agent) was obtained.

The viscosity, the dispersion stability, the adhesion strength and the water-repellency of the obtained resin dispersion were measured. The results are given in Table 9.

EXAMPLE 20

In the same container as used in Example 18, 400 g of a commercially available silicone oil "TSF4600" (Trademark), made by Toshiba Silicone Co., Ltd., serving as a polymerization solvent, was placed and heated to 90° C.

A mixture of 130 g of lauryl methacrylate, 50 g of crotonic acid and 1 g of benzoyl peroxide was added dropwise to the above polymerization solvent at a constant speed over a period of 2 hours, and then the temperature of the reaction mixture was maintained at 90° C. for 3 hours to complete the reaction.

Sequentially, 0.5 g of lauryl dimethylamine and 30 g of glycidyl methacrylate were added to the above copolymer, and the reaction was carried out at 90° C. for 20 hours. Thus, the above copolymer was esterified. It was confirmed by measurement of the decrease in the acid number that the degree of esterification was 50%.

To the above esterified reaction mixture, 600 g of the commercially available silicone oil, "TSF4600" (Trademark), made by Toshiba Silicone Co., Ltd., was added, and a mixture of 40 g of ethyl acrylate and 4 g of benzoyl peroxide was further added dropwise thereto at 90° C. over a period of 3 hours. After the completion of dropping, the temperature of the reaction mixture was maintained at 90° C. for another 5 hours.

Thereafter, 200 g of the commercially available silicone oil "TSF4600" (Trademark), made by Toshiba Silicone Co., Ltd., was added to 200 g of the above reaction mixture. To the above reaction mixture, 20 g of a commercially available polyethylene "DYNH" (Trademark), made by Union Carbide (U.S.A) was added and dissolved therein at 90° C., followed by further stirring for one hour and rapid cooling. Thus, a resin dispersion (a composition of an adhesive agent) was obtained.

The viscosity, the dispersion stability, the adhesion strength and the water-repellency of the obtained resin dispersion were measured. The results are given in Table 9.

EXAMPLE 21

In the same container as used in Example 18, 400 g of a commercially available silicone oil "KF-96" (Trademark), made by Shin-Etsu Chemical Co., Ltd., serving as a polymerization solvent, was placed and heated to 85° C.

A mixture of 120 g of 2-ethylhexyl methacrylate, 60 g of methacrylic acid and 3 g of azobisisobutyronitrile was added dropwise to the above polymerization solvent at a constant speed over a period of 2 hours. Thereafter, the temperature of the reaction mixture was maintained at 85° C. for 2 hours to complete the reaction.

Sequentially, 1 g of lauryl dimethylamine and 30 g of glycidyl acrylate were added to the above copolymer, and the reaction was carried out at 85° C. for 18 hours. Thus, the above copolymer was esterified. It was confirmed by measurement of the decrease in the acid number that the degree of esterification was 50%.

To the above esterified reaction mixture, 400 g of the commercially available silicone oil "KF-96" (Trademark), made by Shin-Etsu Chemical Co., Ltd., was added, and the reaction mixture was heated to 90° C. Thereafter, a mixture of 30 g of vinyl acetate and 3 g of azobisisobutyronitrile was further added dropwise thereto over a period of 3 hours. After the completion of dropping, the temperature of the reaction mixture was maintained at 90° C. for another 5 hours.

Thereafter, 200 g of the commercially available silicone oil "KF-96" (Trademark), made by Shin-Etsu Chemical Co., Ltd., was added to 200 g of the above reaction mixture. To the above reaction mixture, 20 g of a commercially available polyethylene "Alathon-12" (Trademark), made by Du Pont de Nemours, E.I. & Co., was added and dissolved therein at 85° C., followed by stirring for one hour and rapid cooling. Thus, a resin dispersion (a composition of an adhesive agent) was obtained.

The viscosity, the dispersion stability, the adhesion strength and the water-repellency of the obtained resin dispersion were measured. The results are given in Table 9.

EXAMPLE 22

In the same container as used in Example 18, 300 g of a commercially available silicone oil "KF-58" (Trademark), made by Shin-Etsu Chemical Co., Ltd., serving as a polymerization solvent, was placed and heated to 90° C.

A mixture of 150 g of 2-ethylhexyl methacrylate, 35 g of glycidyl methacrylate and 1 g of benzoyl peroxide was added dropwise to the above polymerization solvent over a period of 2 hours. Thereafter, the temperature of the reaction mixture was maintained at 90° C. for 3 hours to complete the reaction. The thus obtained copolymer had a solid content of 40.2%.

Sequentially, 1 g of lauryl dimethylamine, 20 g of maleic acid and 0.05 g of hydroquinone were added to the above copolymer, and the reaction was carried out at 90° C. for 15 hours. Thus, the above copolymer was esterified. It was confirmed that the acid number was 2.0.

To the above esterified reaction mixture, 520 g of the commercially available silicone oil "KF-54" (Trademark), made by Shin-Etsu Chemical Co., Ltd., was added. Thereafter, a mixture of 40 g of vinyltoluene and 3 g of benzoyl peroxide was further added dropwise thereto over a period of 3 hours at 90° C. After the completion of dropping, the temperature of the reaction mixture was maintained at 90° C. for another 5 hours.

Thereafter, 200 g of the commercially available silicone oil "KF-54" (Trademark), made by Shin-Etsu Chemical Co., Ltd., was added to 200 g of the above reaction mixture. To the above reaction mixture, 100 g of a commercially available polyethylene "Sanwax 131P" (Trademark), made by Sanyo Chemical Industries, Ltd., was added and dissolved therein at 90° C., followed by stirring for one hour and rapid cooling. Thus, a resin dispersion (a composition of an adhesive agent) was obtained.

The viscosity, the dispersion stability, the adhesion strength and the water-repellency of the obtained resin dispersion were measured. The results are given in Table 9.

EXAMPLE 23

In the same container as used in Example 18, a mixture of 300 g of a commercially available silicone oil "KF-50" (Trademark), made by Shin-Etsu Chemical Co., Ltd., serving as a polymerization solvent, and a commercially available polyethylene "Sanwax 171P" (Trademark), made by Sanyo Chemical Industries, Ltd., was placed and heated to 90° C.

A mixture of 200 g of stearyl acrylate, 20 g of glycidyl methacrylate and 3 g of azobisisobutyronitrile was added dropwise to the above polymerization solvent over a period of 5 hours, followed by stirring for about 3 hours at 90° C.

Sequentially, 1 g of lauryl dimethylamine, 10 g of acrylic acid and 0.5 g of hydroquinone were added to the above copolymer, and the reaction was carried out at 90° C. for 10 hours.

To the above reaction mixture, 300 g of the commercially available silicone oil "KF-50" (Trademark), made by Shin-Etsu Chemical Co., Ltd., was added. Thereafter, a mixture of 40 g of a styrene monomer and 3 g of azobisisobutyronitrile was further added dropwise thereto over a period of 3 hours at 95° C. After the completion of dropping, the temperature of the reaction mixture was maintained at 95° C. for about 5 hours.

Thereafter, 200 g of the commercially available silicone oil "KF-50" (Trademark), made by Shin-Etsu Chemical Co., Ltd., was added to 150 g of the above reaction mixture, followed by stirring at 90° C. for 30 minutes and rapid cooling. Thus, a resin dispersion (a composition of an adhesive agent) was obtained.

The viscosity, the dispersion stability, the adhesion strength and the water-repellency of the obtained resin dispersion were measured. The results are given in Table 9.

EXAMPLE 24

The procedure for preparation of the resin dispersion as in Example 23 was repeated except that the commercially available polyethylene "Sanwax 171P" (Trademark), made by Sanyo Chemical Industries, Ltd., was replaced by "Paraffin wax" (Trademark), with a melting point of 70° to 72° C., made by Junsei Chemical Co., Ltd, so that a resin dispersion (a composition of an adhesive agent) was prepared.

The viscosity, the dispersion stability, the adhesion strength and the water-repellency of the obtained resin dispersion were measured. The results are given in Table 9.

TABLE 9

|  | A | D (%) | G | J (cp) | K ($\mu$m) | L (g/20) |
|---|---|---|---|---|---|---|
| Ex. 18 | ○ | 98.2 | ○ | 82.0 | 0.3~0.5 | 910 |
| Ex. 19 | ○ | 96.4 | ○ | 64.3 | 0.2~0.5 | 869 |
| Ex. 20 | ○ | 98.4 | ○ | 58.0 | 0.2~0.3 | 760 |
| Ex. 21 | ○ | 93.7 | ○ | 66.5 | 1.0~3 | 870 |
| Ex. 22 | ○ | 97.4 | ○ | 125.0 | 0.4~5 | 1020 |
| Ex. 23 | ○ | 94.8 | ○ | 75.5 | 0.1~0.3 | 800 |
| Ex. 24 | ○ | 96.3 | ○ | 61.0 | 0.05~0.1 | 740 |

A: Water-repellency
B: Rate of polymerization
G: Dispersion stability
○— There was no sedimentation of resin components nor the separation of layers in the resin dispersion after storage at 50° C. for 3 months.
J: Viscosity of the resin dispersion
K: Particle diameter of the resin in the resin dispersion
L: Adhesion strength to the surface of polyethylene

EXAMPLE 25

In a 3l-flask equipped with a stirrer, a thermometer, a condenser and a dropping funnel, 500 g of a commercially available silicone oil "KF96L" (Trademark) with a viscosity of 1 cs, made by Shin-Etsu Chemical Co., Ltd., serving as a polymerization solvent, was placed and heated to 80° C.

A monomer solution consisting of 100 g of lauryl acrylate as "component A", 50 g of a monomer having the following formula (1) as "component B", 10 g of methacrylic acid as "component C" and 5 g of azobisisobutyronitrile was added dropwise to the above polymerization solvent with stirring over a period of 2 hours. Thereafter, the polymerization reaction was carried out for 4 hours, with the temperature of the reaction mixture maintained at 80° C.

  (1)

As a result, a resin dispersion was obtained.
In the above resin dispersion;
 Rate of polymerization: 97%
 Viscosity of the resin dispersion: 120 cp
 Particle diameter of the resin : 0.1 to 0.21 μm

EXAMPLE 26

In the same flask as used in Example 25, 400 g of a commercially available silicone oil "KF58" (Trademark), made by Shin-Etsu Chemical Co., Ltd., serving as a polymerization solvent, was placed and heated to 90° C.

A monomer solution consisting of 95 g of 2-ethylhexyl methacrylate as "component A", 25 g of a monomer having the following formula (2) as "component B", a mixture of 10 g of glycidyl propyl acrylate and 5 g of acrylic acid as "component C" and 2 g of azobisisobutyronitrile was added dropwise to the above polymerization solvent with stirring over a period of one hour. The polymerization reaction was carried out over a period of 6 hours, with the temperature of the reaction mixture maintained at 90° C.

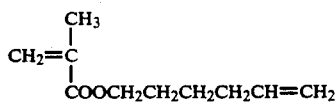  (2)

As a result, a resin dispersion was obtained.
In the above resin dispersion;
 Rate of polymerization: 98.8%
 Viscosity of the resin dispersion: 220 cp
 Particle diameter of the resin: 0.01 to 0.12 μm
 Electrical resistivity of the resin: $1.0 \times 10^{14}$ Ω·cm

EXAMPLE 27

In the same flask as used in Example 25, 400 g of a commercially available silicone oil "HS-200" (Trademark), made by Toray Silicone Co., Ltd., serving as a polymerization solvent, was placed and heated to 90° C.

A monomer solution consisting of 200 g of cyclohexyl acrylate as "component A", 10 g of a monomer having the following formula (3) as "component B", a mixture of 5 g of methacrylic acid and 10 g of glycidyl methacrylate as "component C", and 3 g of benzoyl peroxide was added to the above polymerization solvent with stirring. The polymerization reaction was carried out over a period of 4 hours, with the temperature of the reaction mixture maintained at 90° C.

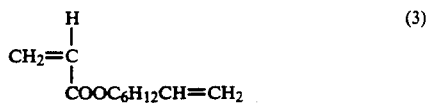  (3)

Thereafter, 0.1 g of vinylpyridine was added to the above reaction mixture to esterify the same at 80° C. over a period of 10 hours.

As a result, a resin dispersion was obtained.
In the above resin dispersion;
 Rate of polymerization: 98%
 Viscosity of the resin dispersion: 320 cp
 Particle diameter of the resin: 0.05 to 1.0 μm This resin dispersion had little odor, and the resin thus obtained had excellent heat resistance and cold temperature resistance.

EXAMPLE 28

In the same flask as used in Example 25, 200 g of a commercially available silicone oil "KF96" (Trademark), with a viscosity of 10 cs, made by Shin-Etsu Chemical Co., Ltd., serving as a polymerization solvent, and 50 g of a commercially available polyethylene "AC Polyethylene 1105" (Trademark), made by Allied Chemical Corp., were placed and the polyethylene was dissolved in the silicone oil at 90° C.

A monomer solution consisting of 100 g of stearyl methacrylate as "component A", 200 g of a monomer having the following formula (4) as "component B", a mixture of 1 g of acrylic acid and 8 g of glycidyl acrylate as "component C", and 10 g of azobisisobutyronitrile was added dropwise to the above polymerization solvent over a period of 2 hours. The polymerization reaction was carried out with stirring over a period of 6 hours, with the temperature of the reaction mixture maintained at 90° C.

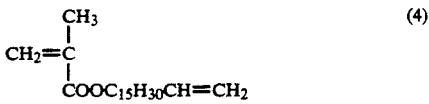  (4)

Thereafter, 100 g of methyl methacrylate as "component D" and 5 g of t-butyl peroxide were added to the above reaction mixture. The polymerization reaction was carried out with stirring over a period of 6 hours at 130° C.

As a result, a resin dispersion was obtained.
In the above resin dispersion;
 Rate of polymerization: 98.6%
 Viscosity of the resin dispersion: 260 cp
 Particle diameter of the resin: 0.1 to 0.2 μm

EXAMPLES 29 TO 34

The procedure for preparation of the resin dispersion as in Example 25 was repeated except that the silicone oil, "component A", "component B", "component C" and "component D" as shown in Table 10 were separately employed. Any of the thus obtained resin dispersions had good water repellency.

TABLE 10

| | Silicone Oil | Component A | Component B | Component C | Component D | A (°) | D (%) | J (cp) | K (μm) |
|---|---|---|---|---|---|---|---|---|---|
| Ex. 29 | KF-56: 500 g | Lauryl methacrylate: 100 g | Compound of formula(5): 8 g(*) | Methacrylic acid: 3 g Glycidyl acrylate: 3 g | Vinyl acetate: 50 g | 29 | 98 | 102 | 0.05~0.15 |
| Ex. 30 | KF-56: 500 g | Lauryl methacrylate: 100 g | Compound of formula(2): 8 g | Methacrylic acid: 3 g Glycidyl acrylate: 3 g | Ethyl acrylate: 50 g | 32 | 97 | 260 | 0.02~0.10 |
| Ex. 31 | KF-54: 500 g | Lauryl methacrylate: 100 g | Compound of formula(3): 5 g | Methacrylic acid: 3 g Glycidyl acrylate: 3 g | Dimethylaminoethyl methacrylate: 30 g | 30 | 98 | 185 | 0.10~0.20 |
| Ex. 32 | KF-54: 500 g | Stearyl methacrylate: 100 g | Compound of formula(6): 10 g(**) | Acrylic acid: 5 g | Methyl methacrylate: 30 g | 26 | 94 | 266 | 0.10~0.15 |
| Ex. 33 | KF-58: 500 g | Stearyl methacrylate: 100 g | Compound of formula(1): 10 g | Acrylic acid: 5 g | Methyl methacrylate: 30 g | 35 | 93 | 290 | 0.05~0.20 |
| Ex. 34 | KF-58: 500 g | Stearyl methacrylate: 100 g | Compound of formula(7): 10 g(***) | Glycidylpropyl methacrylate: 10 g | — | 30 | 96 | 350 | 0.15~0.45 |

In the above table;
A: Water-repellency
D: Rate of polymerization
J: Viscosity of the resin dispersion
K: Particle diameter of the resin in the resin dispersion

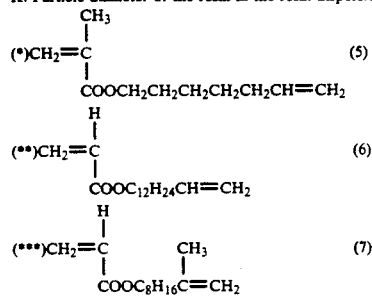

$$(*)\ CH_2=C(CH_3)-COOCH_2CH_2CH_2CH_2CH_2CH=CH_2 \quad (5)$$

$$(**)\ CH_2=C(H)-COOC_{12}H_{24}CH=CH_2 \quad (6)$$

$$(***)\ CH_2=C(H)-COOC_8H_{16}C(CH_3)=CH_2 \quad (7)$$

Preparation of Liquid Developers for Electrophotography

EXAMPLE 35

The following components were dispersed in a Keddy mill for 6 hours, so that a concentrated toner with a viscosity of 30 cp was obtained.

| | |
|---|---|
| Carbon black "Raben 100" (Trademark), made by Columbian Carbon Ltd. | 10 g |
| Resin dispersion obtained in Example 25 | 50 g |
| Silicone oil "KF96L" (Trademark) made by Shin-Etsu Chemical Co., Ltd. (viscosity: 1 cs) | 100 g |

10 g of the above prepared concentrated toner was dispersed in 1 l of the commercially available silicone oil "KF96L" (Trademark) with a viscosity of 1 cs, made by Shin-Etsu Chemical Co., Ltd. Thus, a resin dispersion, which served as a liquid developer for electrophotography, was obtained.

The above prepared liquid developer was placed in a commercially available electrophotographic copying apparatus to yield copy images on a commercially available zinc-oxide-coated photosensitive sheet. As the result of the copy test, images which had a high density, good image fixing performance and improved image drying characteristics were produced on a number of photosensitive sheets.

The above prepared liquid developer was stored at 50° C. for 3 months to forcibly cause the developer to deteriorate. Using this developer, the same copy test as in the above was performed. There was no decrease in image density of the obtained images.

EXAMPLE 36

In a container equipped with a stirrer, a thermometer and a reflux condenser, 300 g of a commercially available silicone oil "KF-96L" (Trademark) with a viscosity of 3.0 cs, made by Shin-Etsu Chemical Co., Ltd., serving as a polymerization solvent, was placed and heated to 95° C.

A mixture of 200 g of 2-ethylhexyl methacrylate, 10 g of glycidyl methacrylate and 3 g of azobisisobutyronitrile was added dropwise to the above polymerization solvent at a constant speed over a period of 3 hours, followed by stirring for one hour to complete the polymerization reaction. Thus, a copolymer was obtained.

Thereafter, 5 g of acrylic acid, 0.1 g of hydroquinone and 1 g of lauryl dimethylamine were added to the above copolymer, and the reaction was carried out at 90° C. for 15 hours. Thus, the above copolymer was esterified. It was confirmed by measurement of the decrease in the acid number that the degree of esterification was in the range of 25 to 30%.

To the above esterified reaction mixture, 500 g of the commercially available silicone oil "KF-96L" (Trademark) with a viscosity of 3.0 cs, made by Shin-Etsu Chemical Co., Ltd., was added, and a mixture of 50 g of methyl methacrylate and 3 g of azobisisobutyronitrile was further added dropwise thereto at 90° C. at a constant speed over a period of 3 hours. After the completion of dropping, the temperature of the reaction mixture was maintained at 90° C. for about 5 hours.

Thereafter, 300 g of the commercially available silicone oil "KF-96L" (Trademark) with a viscosity of 3.0 cs, made by Shin-Etsu Chemical Co., Ltd., serving as a polymerization solvent, was added to 300 g of the above reaction mixture and heated to 90° C. To the above reaction mixture, 50 g of a commercially available polyethylene "Orlizon 805" (Trademark), made by Monsanto Co. (U.S.A) was added and dissolved therein under application of heat for one hour until the reaction mixture became transparent.

To the above prepared graft polymer comprising the polyethylene as a core, 10 g of vinylpyridine and 1 g of azobisisobutyronitrile were added to carry out the reaction at 90° C. for 3 hours.

When the thus obtained resin dispersion was cooled using tap water, with stirring, an emulsion-type resin dispersion was prepared.
In the above emulsion-type resin dispersion;
Solid component: 18.3%
Particle diameter of the resin: 0.3 to 1 μm.

EXAMPLE 37

The procedure for preparation of the emulsion-type resin dispersion as in Example 36 was repeated except that an acrylic acid which was used to esterify the copolymer of 2-ethylhexyl methacrylate and glycidyl methacrylate obtained in Example 36 was replaced by a maleic acid. Thus, an emulsion-type resin dispersion was prepared.

EXAMPLE 38

In the same container as used in Example 36, 400 g of a commercially available silicone oil "HS-200" (Trademark), made by Toray Silicone Co., Ltd., serving as a polymerization solvent, was placed and heated to 95° C.

A mixture of 200 g of stearyl methacrylate, 10 g of glycidyl acrylate and 2 g of benzoyl peroxide was added dropwise to the above polymerization solvent over a period of one hour, followed by stirring for 3 hours at 95° C. to complete the reaction. Thus, a copolymer was obtained.

Sequentially, 1 g of lauryl dimethylamine, 3 g of methacrylic acid and 0.1 g of hydroquinone were added to the above copolymer, and the reaction was carried out at 95° C. for 10 hours. Thus, the above copolymer was esterified. It was confirmed by measurement of the decrease in the acid number that the degree of esterification was 30%.

To the above esterified reaction mixture, 600 g of the commercially available silicone oil "HS-200" (Trademark), made by Toray Silicone Co., Ltd., was added, and a mixture of 60 g of styrene and 4 g of benzoyl peroxide was further added dropwise thereto at 95° C. over a period of 3 hours. After the completion of dropping, the temperature of the reaction mixture was maintained at 95° C. for another 5 hours to perform the graft polymerization.

Thereafter, 200 g of the commercially available silicone oil "HS-200" (Trademark), made by Toray Silicone Co., Ltd., was added to the above reaction mixture and heated to 95° C. To the above reaction mixture, 50 g of a commercially available paraffin wax with a softening point of 70 to 72° C. was added and dissolved therein to carry out the reaction at 95° C. for 40 minutes. Thus, a resin solution was obtained.

To the above prepared resin solution, 5 g of N-vinylpyrrolidone and 1 g of benzoyl peroxide were added to carry out the polymerization reaction at 95° C. for 3 hours.

When the thus obtained reaction mixture was cooled using tap water, with stirring, an emulsion-type resin dispersion was prepared.
In the above emulsion-type resin dispersion;
Solid component: 21%
Particle diameter of the resin: 0.1 to 0.2 μm.

EXAMPLE 39

In the same container as used in Example 36, 400 g of a commercially available silicone oil "KF58" (Trademark), made by Shin-Etsu Chemical Co., Ltd., serving as a polymerization solvent, was placed and heated to 90° C.

A mixture of 200 g of lauryl methacrylate, 3 g of crotonic acid and 1 g of benzoyl peroxide was added dropwise to the above polymerization solvent over a period of 2 hours. Sequentially, the temperature of the reaction mixture was maintained at 90° C. for 3 hours to complete the reaction.

Thereafter, 1 g of lauryl dimethylamine was added to the above reaction mixture, and the esterification reaction was carried out at 90° C. for 20 hours. It was confirmed by measurement of the decrease in the acid number that the degree of esterification was 50%.

To the above esterified reaction mixture, 600 g of the commercially available silicone oil "KF58" (Trademark), made by Shin-Etsu Chemical Co., Ltd., was added, and a mixture of 40 g of ethyl acrylate and 4 g of benzoyl peroxide was further added dropwise thereto at 90° C. over a period of 3 hours. After the completion of dropping, the temperature of the reaction mixture was maintained at 90° C. for another 5 hours.

Thereafter, 200 g of the commercially available silicone oil "Isopar L" (Trademark), made by Exxon Chemical Japan Ltd., was added to 200 g of the above reaction mixture and heated to 90° C. To the above reaction mixture, 20 g of a commercially available polyethylene "DYNH" (Trademark), made by Union Carbide K.K., was added and dissolved therein under application of heat for one hour.

To the above reaction mixture, 3 g of nitrostyrene and 0.5 g of benzoyl peroxide were added to carry out the polymerization reaction at 90° C. for 4 hours.

When the thus obtained reaction mixture was cooled using tap water, with stirred, an emulsion-type resin dispersion was prepared.
In the above emulsion-type resin dispersion;
Solid component: 12.1%
Particle diameter of the resin: 0.3 to 0.5 μm.

EXAMPLE 40

In the same container as used in Example 36, 400 g of a commercially available silicone oil "TSF-410" (Trademark), made by Toshiba Silicone Co., Ltd., serving as a polymerization solvent, was placed and heated to 85° C.

A mixture of 200 g of 2-ethylhexyl methacrylate, 5 g of methacrylic acid and 3 g of azobisisobutyronitrile was added dropwise to the above polymerization solvent over a period of 2 hours. The temperature of the reaction mixture was maintained at 85° C. for 2 hours to complete the reaction.

Sequentially, 1 g of lauryl dimethylamine and 5 g of glycidyl acrylate were added to the above reaction mixture, and the esterification reaction was carried out at 85° C. for 18 hours. It was confirmed by measurement of the decrease in the acid number that the degree of esterification was 50%.

To the above esterified reaction mixture, 400 g of the commercially available silicone oil "TSF-410" (Trademark), made by Toshiba Silicone Co., Ltd., was added, and a mixture of 30 g of vinyl acetate and 3 g of azobisisobutyronitrile was further added dropwise thereto at 90° C. over a period of 3 hours. After the completion of dropping, the temperature of the reaction mixture was maintained at 90° C. for another 5 hours to complete the reaction.

Thereafter, 200 g of the commercially available silicone oil "Isopar H" (Trademark), made by Exxon Chemical Japan Ltd., was added to 200 g of the above reaction mixture and heated to 85° C. To the above reaction mixture, 20 g of a commercially available polyethylene "Alathon-12" (Trademark), made by Du Pont de Nemours, E.I. & Co., was added and dissolved therein to carry out the reaction at 85° C. for one hour.

To the above prepared reaction mixture, 6 g of diethylaminoethyl methacrylate and 0.5 g of azobisisobutyro nitrile were added to carry out the polymerization reaction at 85° C. for 5 hours.

When the thus obtained reaction mixture was cooled using tap water, with stirring, an emulsion-type resin dispersion was prepared.

In the above emulsion-type resin dispersion;
Solid component: 14.1%
Particle diameter of the resin: 0.6 to 0.9 μm.

COMPARATIVE EXAMPLES 5 TO 9

The procedures for preparation of the emulsion-type resin dispersions as in Examples 36 to 40 were respectively repeated except that each silicone oil was replaced by toluene, so that comparative emulsion-type resin dispersions were prepared.

The water- and oil-repellency and the electrical resistivity of the emulsion-type resin dispersions obtained in Examples 36 to 40 and the comparative emulsion-type resin dispersions obtained in Comparative Examples 5 to 9 were measured in the same manner as in the above. The results are given in Table 11.

TABLE 11

|  | A (°) | B (°) | C (Ω · cm) |
| --- | --- | --- | --- |
| Ex. 36 | 30 | 21 | $5.2 \times 10^{13}$ |
| Ex. 37 | 28 | 19 | $4.1 \times 10^{12}$ |
| Ex. 38 | 26 | 18 | $3.0 \times 10^{12}$ |
| Ex. 39 | 29 | 18 | $3.3 \times 10^{13}$ |
| Ex. 40 | 31 | 21 | $1.0 \times 10^{13}$ |
| Comp. Ex. 5 | 11 | 8 | $5.2 \times 10^{12}$ |
| Comp. Ex. 6 | 13 | 8 | $3.2 \times 10^{11}$ |
| Comp. Ex. 7 | 13 | 9 | $2.8 \times 10^{11}$ |
| Comp. Ex. 8 | 12 | 7 | $2.4 \times 10^{12}$ |
| Comp. Ex. 9 | 15 | 8 | $3.0 \times 10^{12}$ |

In the above table;
A: Water-repellency
B: Oil-repellency
C: Electrical resistivity

EXAMPLE 41

In a flask with four arms equipped with a stirrer, a thermometer and a condenser, 200 g of a commercially available silicone oil "KF58" (Trademark), made by Shin-Etsu Chemical Co., Ltd., serving as a polymerization solvent, was placed and heated to 90° C. on an oil bath.

A mixture of 100 g of stearyl methacrylate, 30 g of glycidyl methacrylate and 5 g of azobisisobutyronitrile was added to the above polymerization solvent. The temperature of the reaction mixture was maintained at 90° C. for 5 hours to carry out the copolymerization reaction. Thus, a copolymer was obtained.

Thereafter 0.5 g of hydroquinone, 20 g of β-methacyloxyethyl acid phthalate and 0.02 g of lauryl dimethylamine were added to the above copolymer, and the esterification reaction was carried out at 85° C. for 5 to 10 hours. Thus, the above copolymer was esterified.

In addition, the graft copolymerization was performed with the addition of 50 g of styrene and 1 g of benzoyl peroxide to the above copolymer.

To the above-prepared graft copolymer dispersion, 50 g of a commercially available polyethylene "AC Polyethylene 6A" (Trademark), made by Allied Chemical Corp., was added and dissolved therein for 4 hours at a temperature ranging from 80° to 90° C.

Sequentially, the thus obtained dispersion was separated from the oil bath and cooled using tap water, so that a non-aqueous resin dispersion was prepared.

EXAMPLE 42

In the same flask as used in Example 41, 200 g of a commercially available silicone oil "KF96L" (Trademark) with a viscosity of 2.0 cs, made by Shin-Etsu Chemical Co., Ltd., serving as a polymerization solvent, was placed and heated to 90° C. on an oil bath.

A mixture of 100 g of cetyl methacrylate, 20 g of β-methacryloxyethyl acid hexahydrophthalate and 3 g of azobisisobutyronitrile was added to the above polymerization solvent. The temperature of the reaction mixture was maintained at 100° C. for 4 hours to carry out the copolymerization reaction. Thus, a copolymer was obtained.

Thereafter, 1 g of hydroquinone, 10 g of glycidyl methacrylate and 0.01 g of dodecylamine were added to the above copolymer, and the esterification reaction was carried out at 80° C. for 10 hours. Thus, the above copolymer was esterified.

In addition, the graft copolymerization was performed at 90° C. for 3 hours with the addition of 30 g of methyl methacrylate and 0.05 g of azobisisobutyronitrile to the above copolymer.

To the above-prepared graft copolymer dispersion, 30 g of a commercially available low-molecular-weight polyethylene "Sanwax E200" (Trademark), made by Sanyo Chemical Industries, Ltd., was added. Then, the reaction mixture was heated at 90° C. for one hour, so that a non-aqueous resin dispersion was prepared.

EXAMPLE 43

In the same flask as used in Example 41, 300 g of a commercially available silicone oil "KF54" (Trademark), made by Shin-Etsu Chemical Co., Ltd., serving as a polymerization solvent, was placed and heated to 80° C.

A mixture of 100 g of lauryl methacrylate, 25 g of glycidyl acrylate and 3 g of lauroyl peroxide was added to the above polymerization solvent. The temperature of the reaction mixture was maintained at 80° C. for 5 hours to carry out the copolymerization reaction. Thus, a copolymer was obtained.

Thereafter, 0.1 g of hydroquinone, 0.001 g of lauryl dimethylamine and 20 g of a compound of the following formula (8) were added to the above copolymer, and the esterification reaction was carried out at 80° C. for 10 hours. Thus, the above copolymer was esterified.

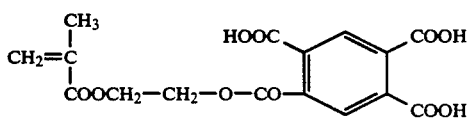
(8)

In addition, the graft copolymerization was performed with the addition of 30 g of vinyl acetate to the above copolymer. Thus, a non-aqueous resin dispersion was prepared.

COMPARATIVE EXAMPLE 10

The procedure for preparation of the non-aqueous resin dispersion in Example 41 was repeated except that the commercially available silicone oil "KF58" (Trademark), made by Shin-Etsu Chemical Co., Ltd., used in Example 41 was replaced by toluene, so that a comparative dispersion was prepared.

COMPARATIVE EXAMPLE 11

The procedure for preparation of the non-aqueous resin dispersion in Example 42 was repeated except that the commercially available silicone oil "KF96L" (Trademark) with a viscosity of 2.0 cs, made by Shin-Etsu Chemical Co., Ltd., used in Example 42 was replaced by toluene, so that a comparative dispersion was prepared.

COMPARATIVE EXAMPLE 12

The procedure for preparation of the non-aqueous resin dispersion in Example 43 was repeated except that the commercially available silicone oil "KF54" (Trademark), made by Shin-Etsu Chemical Co., Ltd., used in Example 43 was replaced by toluene, so that a comparative dispersion was prepared.

The degree of esterification, the rate of polymerization of the obtained graft-copolymers, the particle diameter of the resin, the dispersion stability and the water-repellency of the non-aqueous resin dispersions obtained in Examples 41 to 43 and the comparative dispersions obtained in Comparative Examples 10 to 12 were measured. The results are given in Table 12.

TABLE 12

|  | Ex. 41 | Comp. Ex. 10 | Ex. 42 | Comp. Ex. 11 | Ex. 43 | Comp. Ex. 12 |
| --- | --- | --- | --- | --- | --- | --- |
| A(°) | 32 | 10 | 28 | 8 | 25 | 7 |
| D(%) | 97 | 96 | 96 | 95 | 98 | 95 |
| G' | ○ | x | ○ | x | ○ | x |
| J (μm) | 0.1~0.4 | 10~15 | 0.3~0.5 | 5~10 | 0.9~1.5 | 20~30 |

TABLE 12-continued

|  | Ex. 41 | Comp. Ex. 10 | Ex. 42 | Comp. Ex. 11 | Ex. 43 | Comp. Ex. 12 |
| --- | --- | --- | --- | --- | --- | --- |
| M(%) | 50 | 41 | 38 | 30 | 54 | 32 |

A: Water-repellency
D: The rate of polymerization of the obtained graft copolymer.
G': Dispersion stability, measured by allowing each of the obtained resin dispersions to stand at room temperature for 30 days.
○ - No sedimentation was observed.
x - Sedimentation occurred.
J: Particle diameter of the resin in the resin dispersion
M: Degree of esterification

EXAMPLE 44

In the same flask as used in Example 41, 300 g of dimethyl silicone oil with a viscosity of 1.5 cs, serving as a polymerization solvent, was placed and heated to 95° C.

A mixture of 150 g of 2-ethylhexyl methacrylate, 50 g of glycidyl methacrylate and 3 g of azobisisobutyronitrile was added dropwise to the above polymerization solvent over a period of one hour. The temperature of the reaction mixture was maintained at 95° C. for 4 hours to carry out the copolymerization reaction. Thus, a copolymer was obtained.

Thereafter, 0.5 g of hydroquinone, 20 g of β-methacryloxyethyl acid phthalate and 0.1 g of pyridine were added to the above copolymer, and the esterification reaction was carried out at 80° C. for 15 hours. Thus, the above copolymer was esterified.

In addition, the graft copolymerization was performed at 90° C. for 4 hours with the addition of 100 g of methyl methacrylate and 3 g of azobisisobutyronitrile to the above copolymer. The thus obtained resin was reprecipitated with methanol, and purified by repeating an operation of dissolving the resin in toluene three times.

COMPARATIVE EXAMPLE 13

The procedure for preparation of the resin in Example 44 was repeated except that the dimethyl silicone oil used in Example 44 was replaced by toluene, so that a comparative resin was prepared.

The rate of polymerization, the water- and oil-repellency and the electrical resistivity of the resin obtained in Example 44 and the comparative resin in Comparative Example 13 were measured by the same method as in the above. The results are shown in Table 13.

TABLE 13

|  | A (°) | B (°) | C (Ω · cm) | D (%) |
| --- | --- | --- | --- | --- |
| Ex. 44 | 29.0 | 25.0 | 4 × 10$^{12}$ | 94.5 |
| Comp. Ex. 13 | 10 | 8 | 1 × 10$^{11}$ | 90 |

A: Water-repellency
B: Oil-repellency
C: Electrical resistivity
D: Rate of polymerization

EXAMPLE 45

In a container equipped with a stirrer, a thermometer and a reflux condenser, 300 g of dimethyl silicone oil with a viscosity of 1.5 cs, serving as a polymerization solvent, was placed and heated to 95° C.

A mixture of 200 g of 2-ethylhexyl methacrylate, 10 g of glycidyl methacrylate and 3 g of azobisisobutyronitrile was added dropwise to the above polymerization solvent over a period of one hour. The reaction mixture was stirred for one hour to complete the reaction.

Thereafter, 5 g of acrylic acid, 0.1 g of hydroquinone, 1 g of lauryl dimethylamine were added to the above reaction mixture, and the esterification reaction was carried out at 90° C. for 15 hours. It was confirmed by measurement of the decrease in the acid number that the degree of esterification was 36%.

To the above esterified reaction mixture, 500 g of dimethyl silicone oil was added, and a mixture of 50 g of methyl methacrylate and 3 g of azobisisobutyronitrile was further added dropwise thereto at 90° C. over a period of 5 hours. After the completion of dropping, the temperature of the reaction mixture was maintained at 90° C. for another 5 hours to complete the reaction.

Thereafter, 300 g of the commercially available silicone oil "Isopar G" (Trademark), made by Exxon Chemical Japan Ltd., was added to 300 g of the above reaction mixture and heated to 90° C. To the above reaction mixture, 50 g of a commercially available polyethylene "Orlizon 805" (Trademark), made by Monsanto Co. (U.S.A) was added and dissolved therein under application of heat for one hour until the reaction mixture became transparent. The thus obtained resin solution was cooled using tap water, with stirring. As a result, a resin dispersion was obtained.

In the above resin dispersion;
  Rate of polymerization: 94.2%
  Water-repellency: 25.6°
  Oil-repellency: 28.3°

EXAMPLE 46

In the same container as used in Example 45, 400 g of dimethyl silicone oil with a viscosity of 3.0 cs, serving as a polymerization solvent, was placed and heated to 95° C.

A mixture of 200 g of stearyl methacrylate, 10 g of glycidyl acrylate and 2 g of benzoyl peroxide was added dropwise to the above polymerization solvent over a period of one hour, followed by stirring for 3 hours at 95° C. to complete the reaction. Thus, a copolymer was obtained.

Sequentially, 1 g of lauryl dimethylamine, 3 g of methacrylic acid and 0.1 g of hydroquinone were added to the above copolymer, and the esterification reaction was carried out at 95° C. for 10 hours. Thus, the above copolymer was esterified. It was confirmed by measurement of the decrease in the acid number that the degree of esterification was 32.5%.

To the above esterified reaction mixture, 600 g of the above-mentioned dimethyl silicone oil was added, and a mixture of 60 g of styrene and 6 g of benzoyl peroxide was further added dropwise thereto at 95° C. over a period of 3 hours. After the completion of dropping, the temperature of the reaction mixture was maintained at 95° C. for another 5 hours.

Thereafter, 200 g of the above dimethyl silicone oil was added to the above reaction mixture. To the above reaction mixture, 50 g of a commercially available polyethylene "DYNI" (Trademark), made by Union Carbide (U.S.A) was added and dissolved therein at 95° C, followed by further stirring for 40 minutes and cooling. Thus, a paste-type resin dispersion was obtained.

In the above paste-type resin dispersion;
  Rate of polymerization: 92.8%
  Rate of polymerization of the graft-copolymer: 51.0%
  Water-repellency: 29°

EXAMPLE 47

In the same container as used in Example 45, 400 g of a commercially available silicone oil "TSF400" (Trademark), made by Toshiba Silicone Co., Ltd., serving as a polymerization solvent, was placed and heated to 90° C.

A mixture of 200 g of lauryl methacrylate, 3 g of crotonic acid and 1 g of benzoyl peroxide wa added dropwise to the above polymerization solvent over a period of 2 hours, and then the temperature of the reaction mixture was maintained at 90° C. for 3 hours to complete the reaction.

Sequentially, 1 g of lauryl dimethylamine and 10 g of glycidyl methacrylate were added to the above copolymer, and the esterification reaction was carried out at 90° C. for 20 hours. Thus, the above copolymer was esterified. It was confirmed by measurement of the decrease in the acid number that the degree of esterification was 54%.

To the above esterified reaction mixture, 600 g of a commercially available silicone oil, "TSF400" (Trademark), made by Toshiba Silicone Co., Ltd., was added, and a mixture of 40 g of ethyl acrylate and 6 g of benzoyl peroxide was further added dropwise thereto at 90° C. over a period of 3 hours. After the completion of dropping, the temperature of the reaction mixture was maintained at 90° C. for another 5 hours.

Thereafter, 200 g of the commercially available silicone oil "Isopar L" (Trademark), made by Exxon Chemical Japan Ltd., was added to 200 g of the above reaction mixture. To the above reaction mixture, 20 g of a commercially available polyethylene "DYNH" (Trademark), made by Union Carbide (U.S.A) was added and dissolved therein at 90° C., followed by further stirring for one hour and rapid cooling. Thus, a resin dispersion was obtained.

In the above resin dispersion;
  Rate of polymerization: 93.2%
  Rate of polymerization of the graft-copolymer: 38%
  Water-repellency: 24°

EXAMPLE 48

In the same container as used in Example 45, 400 g of a commercially available silicone oil "TSF404" (Trademark), made by Toshiba Silicone Co., Ltd., serving as a polymerization solvent, was placed and heated to 85° C.

A mixture of 200 g of 2-ethylhexyl methacrylate, 5 g of methacrylic acid and 3 g of azobisisobutyronitrile was added dropwise to the above polymerization solvent over a period of 2 hours. Thereafter, the temperature of the reaction mixture was maintained at 85° C. for 2 hours to complete the reaction.

Sequentially, 1 g of lauryl dimethylamine and 5 g of glycidyl acrylate were added to the above copolymer, and the reaction was carried out at 85° C. for 18 hours. Thus, the above copolymer was esterified. It was confirmed by measurement of the decrease in the acid number that the degree of esterification was 52%.

To the above esterified reaction mixture, 400 g of the above commercially available silicone oil "TSF404" (Trademark), made by Toshiba Silicone Co., Ltd., was added and the temperature of the reaction mixture was heated to 90° C. Thereafter, a mixture of 30 g of vinyl acetate and 3 g of azobisisobutyronitrile was further added dropwise thereto at a constant speed over a period of 3 hours. After the completion of dropping, the temperature of the reaction mixture was maintained at 90° C. for another 5 hours.

Thereafter, 200 g of the commercially available silicone oil "Isopar H" (Trademark), made by Exxon Chemical Japan Ltd., was added to 200 g of the above reaction mixture. To the above reaction mixture, 20 g of a commercially available polyethylene "Nucrel N-599" (Trademark), made by Du Pont—Mitsui Polychemicals Co., Ltd., was added and dissolved therein at 85° C., followed by stirring for one hour and rapid cooling. Thus, a resin dispersion was obtained.

In the above resin dispersion;
Rate of polymerization: 95%
Water-repellency: 31°
Oil-repellency: 26°

EXAMPLE 49

In the same container as used in Example 45, 300 g of a commercially available silicone oil "HS-200" (Trademark), made by Toray Silicone Co., Ltd., serving as a polymerization solvent, was placed and heated to 90° C.

A mixture of 200 g of 2-ethylhexyl methacrylate, 10 g of glycidyl methacrylate and 1 g of benzoyl peroxide was added dropwise to the above polymerization solvent over a period of 2 hours. Thereafter, the temperature of the reaction mixture was maintained at 90° C. for 3 hours to complete the reaction. The thus obtained copolymer had a solid content of 41.1%.

Sequentially, 1 g of lauryl dimethylamine, 3 g of maleic acid and 0.05 g of hydroquinone were added to the above copolymer, and the reaction was carried out at 90° C. for 15 hours. Thus, the above copolymer was esterified. It was confirmed that the acid number was 2.0.

To the above esterified reaction mixture, 520 g of isooctane was added. Thereafter, a mixture of 40 g of vinyltoluene and 3 g of benzoyl peroxide was further added dropwise thereto over a period of 3 hours at 90° C. After the completion of dropping, the temperature of the reaction mixture was maintained at 90° C. for another 5 hours. Thus, a resin dispersion was obtained.

In the above resin dispersion;
Rate of polymerization: 92.5%
Water-repellency: 31°
Oil-repellency: 30°

EXAMPLE 50

In the same container as used in Example 45, 300 g of dimethyl silicone oil with a viscosity of 1.5 cs, serving as a polymerization solvent, was placed and heated to 95° C.

A mixture of 150 g of 2-ethylhexyl methacrylate, 50 g of glycidyl methacrylate and 3 g of azobisisobutyronitrile was added dropwise to the above polymerization solvent over a period of one hour. The temperature of the reaction mixture was maintained at 95° C. for 4 hours to carry out the polymerization reaction.

Sequentially, 5 g of methacrylic acid, 0.1 g of hydroquinone and 0.5 g of lauryl dimethylamine were added to the above copolymer, and the reaction was carried out at 80° C. for 20 hours. It was confirmed that the degree of esterification was 32%.

To the above esterified reaction mixture, 500 g of the above-mentioned dimethyl silicone oil was added. Thereafter, a mixture of 50 g of methyl methacrylate and 3 g of azobisisobutyronitrile was further added and the polymerization reaction was carried out at 90° C. for 3 hours.

The thus obtained resin was reprecipitated with methanol, and purified by repeating an operation of dissolving the resin in toluene three times.

COMPARATIVE EXAMPLE 14

The procedure for preparation of the resin in Example 50 was repeated except that the dimethyl silicone oil used in Example 50 was replaced by toluene, so that a comparative resin was prepared.

The rate of polymerization, the water- and oil-repellency and the electrical resistivity of the resin obtained in Example 50 and the comparative resin in Comparative Example 14 were measured by the same method as in the above. The results are shown in Table 14.

TABLE 14

|  | A (°) | B (°) | C ($\Omega \cdot$ cm) | D (%) |
|---|---|---|---|---|
| Ex. 50 | 25.1 | 20.5 | $2.8 \times 10^{13}$ | 90.8 |
| Comp. Ex. 14 | 13 | 9.0 | $1.2 \times 10^{11}$ | 89.1 |

A: Water-repellency
B: Oil-repellency
C: Electrical resistivity
D: Rate of polymerization

EXAMPLE 51

In a 2 l-flask equipped with a stirrer, a thermometer and a reflux condenser, 800 g of a commercially available silicone oil "KF96L" (Trademark) with a viscosity of 1.5 cs, made by Shin-Etsu Chemical Co., Ltd., serving as a polymerization solvent, was placed and heated to 90° C.

A solution consisting of 170 g of lauryl methacrylate, 80 g of diethylene glycol dimethacrylate and 8 g of benzoyl peroxide was added dropwise to the above polymerization solvent over a period of 2 hours to carry out the polymerization reaction. The reaction mixture was stirred for 2 hours to complete the reaction, with the temperature thereof maintained at 95° C.

As a result, a resin dispersion was obtained.
In the above resin dispersion;
Rate of polymerization: 97%
Viscosity of the resin dispersion: 270 cp
Content insoluble in tetrahydrofuran (the content which took place gelation in the resin): 25 wt.%

EXAMPLE 52

250 g of the resin dispersion obtained in Example 51 was mixed with 20 g of a commercially available polyethylene "DYNF" (Trademark), made by Union Carbide K.K., in a flask.

The above polyethylene was dissolved in the resin dispersion at 110° C. for 8 hours, and the mixture was rapidly cooled. Thus, a polyethylene-containing resin dispersion with a viscosity of 100 cp was prepared.

In the above resin dispersion;
Particle diameter of the resin: 3 to 5 μm

EXAMPLE 53

In the same container as used in Example 51, 800 g of a commercially available silicone oil "HS-200" (Trademark), made by Toray Silicone Co., Ltd., serving as a polymerization solvent, was placed and heated to 95° C.

To the above polymerization solvent, a solution consisting of 170 g of cetyl methacrylate, 3 g of methacrylic acid, 50 g of dipropylene glycol methacrylate and 5 g of azobisisobutyronitrile was added dropwise over a period of one hour to carry out the polymerization reaction. The temperature of the reaction mixture was maintained at 95° C. for 8 hours to complete the reaction. Thus, a resin dispersion was prepared.

In the above resin dispersion;
Rate of polymerization: 99%
Viscosity of the resin dispersion: 320 cp
Content insoluble in tetrahydrofuran (the content which took place gelation in the resin): 32 wt.%

EXAMPLE 54

250 g of the resin dispersion obtained in Example 53 was mixed with 18 g of a commercially available purified bees wax in a flask, followed by stirring at 100° C. for 2 hours.

The above mixture was then cooled, so that a beeswax-containing resin dispersion with a viscosity of 110 cp was prepared.

In the above resin dispersion;
Particle diameter of the resin: 2.0 to 3.8 μm

EXAMPLE 55

In the same container as used in Example 51, 800 g of a commercially available silicone oil "TSF401" (Trademark), made by Toshiba Silicone Co., Ltd., serving as a polymerization solvent, and 10 g of silica particles with a particle size of 0.5 to 1 μm were placed and heated to 95° C.

To the above mixture, a solution consisting of 150 g of 2-ethylhexyl methacrylate, 50 g of trimethylolpropane triacrylate and 5 g of azobisisobutyronitrile was added dropwise over a period of 2 hours to carry out the polymerization reaction. The reaction mixture was further stirred at 95° C. for 2 hours to complete the reaction. Thus, a resin dispersion was prepared.

In the above resin dispersion;
Rate of polymerization: 98%
Viscosity of the resin dispersion: 120 cp
Particle diameter of the resin: 1 to 8 μm

EXAMPLE 56

In the same container as used in Example 51, 800 g of a commercially available silicone oil "KF58" (Trademark), made by Shin-Etsu Chemical Co., Ltd., serving as a polymerization solvent, and 50 g of a commercially available polyethylene "Sanwax 181-P" (Trademark), made by Sanyo Chemical Industries, Ltd., were placed and heated to 95° C.

To the above mixture, a solution consisting of 150 g of stearyl methacrylate, 3 g of dimethylaminoethyl methacrylate, 21 g of tetramethylolmethane tetramethacrylate and 5 g of lauryl peroxide was added dropwise over a period of one hour at a temperature of 95° C. Furthermore, the temperature of the reaction mixture was maintained at 95° C. for another 8 hours to complete the reaction. Thus, a resin dispersion was prepared.

In the above resin dispersion;
Rate of polymerization: 96%
Viscosity of the resin dispersion: 95 cp
Particle diameter of the resin: 0.8 to 4 μm

EXAMPLE 57

In the same container as used in Example 51, 300 g of dimethyl silicone oil with a viscosity of 1.5 cs, serving as a polymerization solvent, was placed and heated to 95° C.

A mixture of 150 g of 2-ethylhexyl methacrylate, 5 g of ethylene glycol dimethacrylate, 3 g of methacrylic acid, 20 g of styrene, 50 g of glycidyl methacrylate and 3 g of azobisisobutyronitrile was added dropwise to the above polymerization solvent over a period of one hour. The temperature of the reaction mixture was maintained at 95° C. for 4 hours to carry out the copolymerization reaction. Thus, a copolymer was obtained.

The thus obtained resin was reprecipitated with methanol, and purified by repeating an operation of dissolving the resin in toluene three times.

COMPARATIVE EXAMPLE 15

The procedure for preparation of the resin in Example 57 was repeated except that the dimethyl silicone oil used in Example 57 was replaced by toluene, so that a comparative resin was prepared.

The rate of polymerization, the water- and oil-repellency and the electrical resistivity of the resin obtained in Example 57 and the comparative resin in Comparative Example 15 were measured by the same method as in the above. The results are shown in Table 15.

TABLE 15

| | A (°) | B (°) | C (Ω · cm) | D (%) | N (wt. %) |
|---|---|---|---|---|---|
| Ex. 57 | 32.0 | 28.0 | $9 \times 10^{12}$ | 95 | 29 |
| Comp. Ex. 15 | 10 | 8 | $8 \times 10^{11}$ | 89 | 24 |

A: Water-repellency
B: Oil-repellency
C: Electrical resistivity
D: Rate of polymerization
N: Content of resin which took place gelation

EXAMPLE 58

In a 2 l-flask equipped with a stirrer, thermometer and a reflux condenser, 300 g of dimethyl silicone oil with a viscosity of 1.5 cs, serving as a polymerization solvent, was placed and heated to 95° C.

A mixture of 150 g of 2-ethylhexyl methacrylate, 5 g of divinylbenzene, 190 g of styrene, 50 g of glycidyl methacrylate and 3 g of azobisisobutyronitrile was added dropwise to the above polymerization solvent over a period of one hour. The temperature of the reaction mixture was maintained at 95° C. for 4 hours to carry out the copolymerization reaction. Thus, a copolymer was obtained.

The thus obtained resin was reprecipitated with methanol, and purified by repeating an operation of dissolving the resin in toluene three times.

COMPARATIVE EXAMPLE 16

The procedure for preparation of the resin in Example 58 was repeated except that the dimethyl silicone oil used in Example 58 was replaced by toluene, so that a comparative resin was prepared.

The rate of polymerization, the water- and oil-repellency and the electrical resistivity of the resin obtained in Example 58 and the comparative resin in Comparative Example 16 were measured by the same method as in the above. The results are shown in Table 16.

TABLE 16

| | A (°) | B (°) | C (Ω · cm) | D (%) | N (wt. %) |
|---|---|---|---|---|---|
| Ex. 58 | 28.0 | 22.0 | $5.8 \times 10^{13}$ | 96.2 | 21.3 |
| Comp. | 11 | 8 | $2 \times 10^{11}$ | 90 | 18.0 |

TABLE 16-continued

| | A (°) | B (°) | C (Ω · cm) | D (%) | N (wt. %) |
|---|---|---|---|---|---|
| Ex. 16 | | | | | |

A: Water-repellency
B: Oil-repellency
C: Electrical resistivity
D: Rate of polymerization
N: Content of resin which took place gelation

EXAMPLE 59

In the same flask as used in Example 58, 300 g of a commercially available silicone oil "HS-200" (Trademark), made by Toray Silicone Co., Ltd., serving as a polymerization solvent, and 30 g of colloidal silica were placed and heated to 90° C.

To the above mixture, a solution consisting of 150 g of 2-ethylhexyl methacrylate, 15 g of glycidyl methacrylate, 20 g of p-divinylbenzene, 40 g of methyl methacrylate and 6.3 g of lauroyl peroxide was added dropwise, and the reaction mixture was further stirred at 90° C. for 4 hours to complete the reaction. Thus, a resin dispersion was prepared.
In the above resin dispersion;
Rate of polymerization: 98.2%
Viscosity of the resin dispersion: 100 cp
Particle diameter of the resin: 0.5 to 2.0 μm

EXAMPLE 60

In the same flask as used in Example 58, 300 g of a commercially available silicone oil "KF54" (Trademark), made by Shin-Etsu Chemical Co., Ltd., serving as a polymerization solvent, and 60 g of a commercially available polyethylene "AC Polyethylene 6" (Trademark), made by Allied Chemical Corp., were placed and heated to 95° C.

To the above mixture, a solution consisting of 180 g of stearyl methacrylate, 40 g of lauryl methacrylate, 3 g of fumaric acid, 20 g of o-nonyl divinylbenzene and 4 g of lauryl peroxide was added dropwise over a period of 3 hours at a temperature of 95° C. The reaction mixture was stirred for 3 hours, with the temperature thereof maintained at 95° C. to complete the reaction. Thus, a resin dispersion was prepared.
In the above resin dispersion;
Rate of polymerization: 95%
Viscosity of the resin dispersion: 100 cp
Particle diameter of the resin: 0.3 to 0.5 μm

EXAMPLE 61

In the same flask as used in Example 58, 300 g of a commercially available silicone oil "TSF4440" (Trademark), made by Toshiba Silicone Co., Ltd., serving as a polymerization solvent, 180 g of cetyl methacrylate, 40 g of dodecyl acrylate, 15 g of p-divinylbenzene, 5 g of acrylic acid and 3 g of benzoyl peroxide were placed, and this mixture was stirred for 6 hours to carry out the polymerization reaction, with the temperature thereof maintained at 90° C.
Thus, a resin dispersion was prepared.
In the above resin dispersion;
Rate of polymerization: 96.4%
Viscosity of the resin dispersion: 160 cp
Content of resin which took place gelation: 32 wt.%

EXAMPLE 62

In a 3l-flask with four side arms equipped with a stirrer, a thermometer, a condenser and a dropping funnel, 500 g of a commercially available silicone oil "KF96L" (Trademark) with a viscosity of 1 cs, made by Shin-Etsu Chemical Co., Ltd., serving as a polymerization solvent, was placed and heated to 80° C.

A monomer solution consisting of 100 g of lauryl acrylate, 50 g of a compound having the following formula (1), 10 g of methacrylic acid and 5 g azobisisobutyronitrile was added dropwise to the above polymerization solvent with stirring over a period of 2 hours. The polymerization reaction was carried out over a period of 4 hours, with the temperature of the reaction mixture maintained at 80° C.

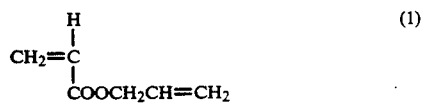

As a result, a resin dispersion was obtained.
In the above resin dispersion;
Rate of polymerization: 96%
Viscosity of the resin dispersion: 160 cp
Particle diameter of the resin: 0.2 to 0.3 μm

EXAMPLE 63

In the same flask as used in Example 62, 400 g of a commercially available silicone oil "HS-200" (Trademark), made by Toray Silicone Co., Ltd., serving as a polymerization solvent, was placed and heated to 90° C.

A monomer solution consisting of 95 g of 2-ethylhexyl methacrylate, 25 g of a compound having the following formula (2), 10 g of glycidyl propyl acrylate, 5 g of acrylic acid and 2 g of azobisisobutyronitrile was added dropwise to the above polymerization solvent with stirring over a period of one hour. The polymerization reaction was carried out over a period of 6 hours, with the temperature of the reaction mixture maintained at 90° C.

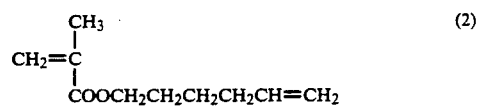

As a result, a resin dispersion was obtained.
In the above resin dispersion;
Rate of polymerization: 99%
Viscosity of the resin dispersion: 276 cp
Particle diameter of the resin: 0.1 to 0.2 μm

EXAMPLE 64

In the same flask as used in Example 62, 400 g of a commercially available silicone oil "HS-200" (Trademark), made by Toray Silicone Co., Ltd., serving as a polymerization solvent, was placed and heated to 90° C.

A monomer solution consisting of 200 g of cyclohexyl acrylate, 10 g of a compound having the following formula (3), 5 g of methacrylic acid, 10 g of glycidyl methacrylate and 3 g of benzoyl peroxide was added to the above polymerization solvent with stirring. The polymerization reaction was carried out over a period of 4 hours, with the temperature of the reaction mixture maintained at 90° C.

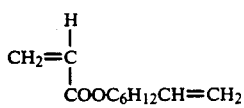 (3)

Thereafter, 0.1 g of vinylpyridine was added to the above reaction mixture to esterify the same at 80° C. over a period of 10 hours.

As a result, a resin dispersion was obtained.
In the above resin dispersion;
 Rate of polymerization: 97%
 Viscosity of the resin dispersion: 290 cp
 Particle diameter of the resin: 0.2 to 0.3 μm

EXAMPLE 65

In the same flask as used in Example 62, 200 g of a commercially available silicone oil "TSF434" (Trademark), made by Toshiba Silicone Co., Ltd., serving as a polymerization solvent, and 50 g of a commercially available polyethylene "AC Polyethylene 1106" (Trademark), made by Allied Chemical Corp., were placed and the polyethylene was dissolved in the silicone oil at 90° C.

A monomer solution consisting of 100 g of stearyl methacrylate, 200 g of a compound having the following formula (4), 1 g of acrylic acid, 8 g of glycidyl acrylate and 10 g of azobisisobutyronitrile was added dropwise to the above polymerization solvent over a period of 2 hours. The reaction mixture was stirred to carry out the polymerization reaction over a period of 6 hours, with the temperature thereof maintained at 90° C.

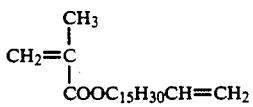 (4)

Thereafter, 100 g of methyl methacrylate and 5 g of t-butyl peroxide were added to the above reaction mixture. The polymerization reaction was carried out with stirring over a period of 6 hours at 130° C.

As a result, a resin dispersion was obtained.
In the above resin dispersion;
 Rate of polymerization: 99%
 Viscosity of the resin dispersion: 300 cp
 Particle diameter of the resin: 0.05 to 0.1 μm

EXAMPLE 66

In the same flask as used in Example 62, 300 g of dimethyl silicone oil with a viscosity of 1.5 cs, serving as a polymerization solvent, was placed and heated to 95° C.

A monomer solution consisting of 150 g of 2-ethylhexyl methacrylate, 1.5 g of methacrylic acid, 5.3 g of a compound having the following formula (9), 5 g of glycidyl methacrylate and 3 g of azobisisobutyronitrile was added dropwise to the above polymerization solvent over a period of one hour. The polymerization reaction was carried out over a period of 4 hours, with the temperature of the reaction mixture maintained at 95° C.

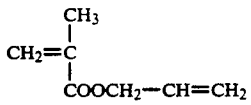 (9)

Thereafter, the polymerization reaction was continued for 2 hours with the addition thereto of 0.5 g of pyridine.

Then, 30 g of methyl methacrylate and 2 g of azobisisobutyronitrile were added to the above reaction mixture. The polymerization reaction was carried out over a period of 5 hours at 80° C.

The thus obtained resin was reprecipitated with methanol, and purified by repeating an operation of dissolving the resin in toluene three times.

COMPARATIVE EXAMPLE 17

The procedure for preparation of the resin in Example 66 was repeated except that the dimethyl silicone oil used in Example 66 was replaced by toluene, so that a comparative resin was prepared.

The rate of polymerization, the water- and oil-repellency and the electrical resistivity of the resin obtained in Example 66 and the comparative resin in Comparative Example 17 were measured by the same method as in the above. The results are shown in Table 17.

TABLE 17

|  | A (°) | B (°) | C (Ω·cm) | D (%) |
|---|---|---|---|---|
| Ex. 66 | 29.0 | 20.0 | $5 \times 10^{12}$ | 96.1 |
| Comp. Ex. 17 | 10 | 8 | $4 \times 10^{11}$ | 90.5 |

A: Water-repellency
B: Oil-repellency
C: Electrical resistivity
D: Rate of polymerization

EXAMPLE 67

In a 2 1-flask equipped with a stirrer, a thermometer and a reflux condenser, 300 g of a commercially available silicone oil "KF58" (Trademark), made by Shin-Etsu Chemical Co., Ltd., serving as a polymerization solvent, was placed and heated to 90° C.

A solution consisting of 170 g of lauryl methacrylate, 30 g of a compound having the following formula (10) and 3 g of benzoyl peroxide was added dropwise to the above polymerization solvent over a period of 2 hours in a stream of nitrogen. The reaction mixture was stirred for 2 hours to complete the reaction, with the temperature thereof maintained at 95° C.

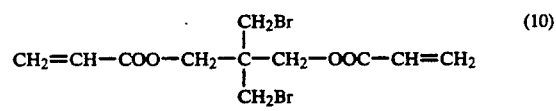 (10)

As a result, a resin dispersion was obtained.
In the above resin dispersion;
 Rate of polymerization: 96%
 Viscosity of the resin dispersion: 240 cp
 Particle diameter of the resin: 3 to 4 μm
 Content which took place gelation in the resin: 36 wt.%

EXAMPLE 68

250 g of the resin dispersion obtained in Example 67 was mixed with 20 g of a commercially available polyethylene "DYNF" (Trademark), made by Union Carbide K.K., in a flask.

The above polyethylene was dissolved in the resin dispersion at 110° C. for 3 hours, and the mixture was rapidly cooled. Thus, a polyethylene-containing resin dispersion was prepared.

In the above resin dispersion;
Viscosity of the resin dispersion: 100 cp
Particle diameter of the resin: 1 to 2 μm

EXAMPLE 69

In the same container as used in Example 67, 300 g of a commercially available silicone oil "KF-96L" (Trademark) with a viscosity of 1.5 cs, made by Shin-Etsu Chemical Co., Ltd., serving as a polymerization solvent, was placed and heated to 90° C.

To the above polymerization solvent, a solution consisting of 170 g of cetyl methacrylate, 20 g of a compound having the following formula (11), 10 g of N-vinylpyridine and 5 g of azobisisobutyronitrile was added dropwise over a period of one hour to carry out the polymerization reaction.

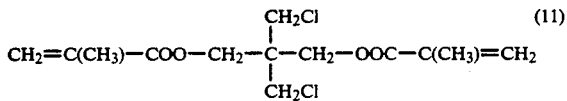

(11)

The temperature of the reaction mixture was maintained at 95° C. for 3 hours to complete the reaction. Thus, a resin dispersion was prepared.

In the above resin dispersion;
Rate of polymerization: 98.1%
Viscosity of the resin dispersion: 71 cp
Particle diameter of the resin: 1 to 1.5 μm
Content which took place gelation in the resin: 26.3 wt.%

EXAMPLE 70

250 g of the resin dispersion obtained in Example 69 was mixed with 18 g of a commercially available purified bees wax in a flask, followed by stirring at 100° C. for 2 hours.

The above mixture was then cooled, so that a beeswax-containing resin dispersion with a viscosity of 200 cp was prepared.

In the above resin dispersion;
Particle diameter of the resin: 0.5 to 1 μm

EXAMPLE 71

In the same container as used in Example 67, 300 g of a commercially available silicone oil "HS-200" (Trademark), made by Toray Silicone Co., Ltd., serving as a polymerization solvent, and 10 g of silica particles with a particle size of 1 to 2 μm were placed and heated to 95° C.

To the above mixture, a solution consisting of 150 g of 2-ethylhexyl methacrylate, 15 g of a compound having the following formula (12), 28 g of glycidyl methacrylate, 125 g of styrene and 5 g of azobisisobutyronitrile was added dropwise over a period of 2 hours to carry out the polymerization reaction.

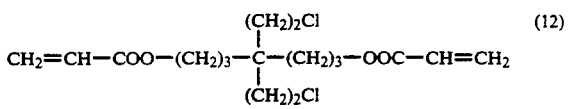

(12)

The reaction mixture was further stirred at 95° C. for 2 hours to complete the reaction. Thus, a resin dispersion was prepared.

In the above resin dispersion;
Rate of polymerization: 97.8%
Viscosity of the resin dispersion: 162 cp
Particle diameter of the resin: 2 to 5 μm
Content which took place gelation in the resin: 48.3 wt.%

EXAMPLE 72

In the same container as used in Example 69, 300 g of a commercially available silicone oil "KF58" (Trademark), made by Shin-Etsu Chemical Co., Ltd., serving as a polymerization solvent, was placed and heated to 95° C.

To the above mixture, a solution consisting of 50 g of 2-ethylhexyl methacrylate, 130 g of styrene, 20 g of a compound having the following formula (13), 50 g of glycidyl methacrylate and 3 g of azobisisobutyronitrile was added dropwise over a period of one hour at a temperature of 95° C.

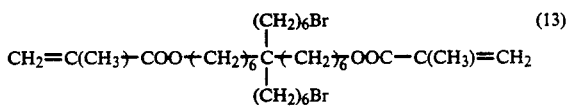

(13)

Furthermore, the temperature of the reaction mixture was maintained at 95° C. for 4 hours to complete the reaction.

The thus obtained resin was reprecipitated with methanol, and purified by repeating an operation of dissolving the resin in toluene three times.

COMPARATIVE EXAMPLE 18

The procedure for preparation of the resin in Example 72 was repeated except that the silicone oil used in Example 72 was replaced by toluene, so that a comparative resin was prepared.

The rate of polymerization, the water- and oil-repellency, the electrical resistivity of the resins, the content which took place gelation in the resins obtained in Example 72 and Comparative Example 18 were measured by the same method as in the above. The results are shown in Table 18.

TABLE 18

| | A (°) | B (°) | C (Ω·cm) | D (%) | N (wt. %) |
|---|---|---|---|---|---|
| Ex. 72 | 32 | 26 | $3.2 \times 10^{13}$ | 93.8 | 39.5 |
| Comp. Ex. 18 | 11 | 9 | $1.8 \times 10^{12}$ | 89.9 | 16.1 |

A: Water-repellency
B: Oil-repellency
C: Electrical resistivity
D: Rate of polymerization
N: Content which took place gelation in the resin

EXAMPLE 73

In a 3l-flask equipped with a stirrer, a thermometer, a condenser and a dropping funnel, 500 g of a commercially available silicone oil "KF96L" (Trademark) with a viscosity of 2.0 cs, made by Shin-Etsu Chemical Co., Ltd., serving as a polymerization solvent, was placed and heated to 85° C.

A mixture of 100 g of lauryl acrylate, 50 g of a compound having the following formula (14) and 5 g of azobisisobutyronitrile was added dropwise to the above polymerization solvent with stirring over a period of 2 hours.

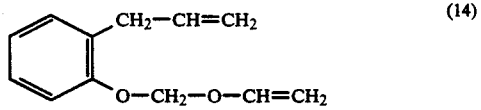

The reaction mixture was stirred for 4 hours to carry out the polymerization reaction, with the temperature thereof maintained at 85° C. Thereafter, the reaction mixture was maintained at 110° C. for 6 hours, with the addition thereto of 3 g of di-t-butyl peroxide.

As a result, a resin dispersion was obtained.
In the above resin dispersion;
  Rate of polymerization: 96.5%
  Viscosity of the resin dispersion: 210 cp
  Content which took place gelation in the resin: 28 wt.%

EXAMPLE 74

In the same flask as used in Example 73, 400 g of a commercially available silicone oil "HS-200" (Trademark), made by Toray Silicone Co., Ltd., serving as a polymerization solvent, was placed and heated to 60° C.

A mixture of 95 g of lauryl methacrylate, 120 g of styrene, 25 g of a compound having the following formula (15) and 2 g of azobisisobutyronitrile was added dropwise to the above polymerization solvent with stirring over a period of one hour.

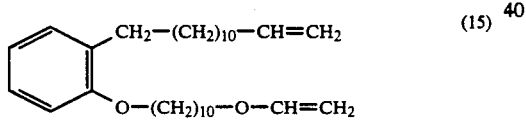

The polymerization reaction was carried out for 6 hours, with the temperature of the reaction mixture maintained at 60° C. Thereafter, the reaction mixture was stirred at 90° C. for 4 hours, with the addition thereto of 4 g of benzoyl peroxide.

As a result, a resin dispersion was obtained.
In the above resin dispersion;
  Rate of polymerization: 97.0%
  Viscosity of the resin dispersion: 210 cp
  Content which took place gelation in the resin: 34.2 wt.%

EXAMPLE 75

In the same flask as used in Example 73, 400 g of a commercially available silicone oil "KF54" (Trademark), made by Shin-Etsu Chemical Co., Ltd., serving as a polymerization solvent, was placed and heated to 90° C.

A mixture of 100 g of styrene, 20 g of n-butyl acrylate, 20 g of stearyl methacrylate, 10 g of a compound having the following formula (16) and 3 g of benzoyl peroxide was added dropwise to the above polymerization solvent over a period of 4 hours, with stirring.

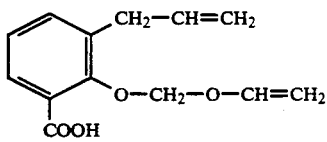

The reaction mixture was stirred at 90° C. for 4 hours to complete the polymerization reaction, with the addition thereto of 30 g of styrene and 3 g of benzoyl peroxide.

As a result, a non-aqueous resin dispersion was obtained.
In the above resin dispersion;
  Rate of polymerization: 94%
  Viscosity of the resin dispersion: 280 cp
  Content which took place gelation in the resin: 42 wt.%

EXAMPLE 76

In the same flask as used in Example 73, 200 g of a commercially available silicone oil "KF56" (Trademark), made by Shin-Etsu Chemical Co., Ltd., serving as a polymerization solvent, and 50 g of a commercially available polyethylene "AC Polyethylene 1106" (Trademark), made by Allied Chemical Corp., were placed and the polyethylene was dissolved in the silicone oil at 90° C.

A mixture of 200 g of a compound having the following formula (17) and 10 g of azobisisobutyronitrile was added dropwise to the above polymerization solvent over a period of 2 hours.

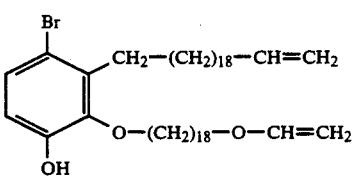

The reaction mixture was stirred for 6 hours, with the temperature thereof maintained at 90° C. Thereafter, the reaction mixture was stirred at 130° C. for 6 hours to complete the polymerization reaction, with the addition thereto of 100 g of cetyl methacrylate and 5 g of t-butyl peroxide.

As a result, a polyethylene-containing resin dispersion was obtained.
In the above resin dispersion;
  Rate of polymerization: 97.1%
  Viscosity of the resin dispersion: 420 cp
  Content which took place gelation in the resin: 26 wt.%

EXAMPLE 77

13 g of a commercially available polyethylene "AC Polyethylene 610" (Trademark), made by Allied Chemical Corp., was added to the resin dispersion obtained in Example 74 and dissolved therein at 90° C. for 2 hours.

Thereafter, the above mixture was cooled, so that a polyethylene-containing resin dispersion with a viscosity of 260 cp was obtained.

EXAMPLE 78

40 g of a commercially available wax "Sanwax 131-P" (Trademark), made by Sanyo Chemical Industries, Ltd., was added to the polyethylene-containing resin dispersion obtained in Example 76 and dissolved therein at 90° C. for 2 hours.

Thereafter, the above mixture was cooled, so that a polyethylene-and-wax-containing resin dispersion with a viscosity of 480 cp was obtained.

EXAMPLE 79

In the same flask as used in Example 73, 300 g of a commercially available silicone oil "KF96L" (Trademark) with a viscosity of 1.0 cs, made by Shin-Etsu Chemical Co., Ltd., serving as a polymerization solvent, was placed and heated to 95° C.

A mixture of 15 g of 2-ethylhexyl methacrylate, 100 g of styrene, 20 g of a compound having the following formula (18), 50 g of glycidyl methacrylate and 3 g of azobisisobutyronitrile was added dropwise to the above polymerization solvent over a period of one hour.

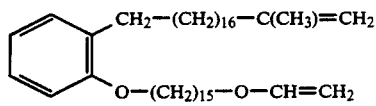

(18)

The polymerization reaction was carried out over a period of 4 hours, with the temperature of the reaction mixture maintained at 95° C. The thus obtained resin was reprecipitated with methanol, and purified by repeating an operation of dissolving the resin in toluene three times.

COMPARATIVE EXAMPLE 19

The procedure for preparation of the resin in Example 79 was repeated except that the silicone oil used in Example 79 was replaced by toluene, so that a comparative resin was prepared.

The rate of polymerization, the water- and oil-repellency, the electrical resistivity of the resins, the content which took place gelation in the resins obtained in Example 79 and Comparative Example 19 were measured by the same method as in the above. The results are shown in Table 19.

TABLE 19

|  | A (°) | B (°) | C (Ω·cm) | D (%) | N (wt. %) |
|---|---|---|---|---|---|
| Ex. 79 | 39 | 21 | $2.2 \times 10^{12}$ | 92.8 | 46.1 |
| Comp. Ex. 19 | 12 | 8 | $5.6 \times 10^{11}$ | 90.9 | 25.3 |

A: Water-repellency
B: Oil-repellency
C: Electrical resistivity
D: Rate of polymerization
N: Content which took place gelation in the resin

EXAMPLE 80

In a 2l-flask equipped with a stirrer, a thermometer and a reflux condenser, 300 g of a commercially available silicone oil "KF96L" (Trademark) with a viscosity of 2.0 cs, made by Shin-Etsu Chemical Co., Ltd., serving as a polymerization solvent, was placed and heated to 95° C.

A solution consisting of 190 g of dodecyl methacrylate, 10 g of a compound having the following formula (19) and 6 g of azobisisobutyronitrile was added dropwise to the above polymerization solvent over a period of 3 hours.

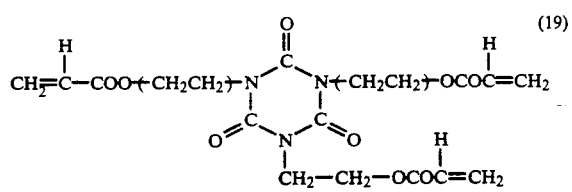

(19)

The reaction mixture was stirred for 4 hours to complete the reaction, with the temperature thereof maintained at 95° C.

As a result, a resin dispersion was obtained.
In the above resin dispersion;
  Rate of polymerization: 97%
  Viscosity of the resin dispersion: 210 cp
  Content which took place gelation in the resin: 34.2 wt.%
  Particle diameter of the resin: 0.20 to 0.30 μm

EXAMPLE 81

300 g of the resin dispersion obtained in Example 80 was mixed with 10 g of colloidal silica in a flask.

The mixture was heated at 100° C. for 3 hours, and cooled. Thus, a colloidal silica-containing resin dispersion was prepared.
In the above resin dispersion;
  Viscosity of the resin dispersion: 240 cp
  Particle diameter of the resin: 1 to 3 μm

EXAMPLE 82

In the same flask as used in Example 80, 300 g of a commercially available silicone oil "KF56" (Trademark), made by Shin-Etsu Chemical Co., Ltd., serving as a polymerization solvent, was placed and heated to 90° C.

To the above polymerization solvent, a solution consisting of 300 g of lauryl methacrylate, 5 g of N-vinylpyridine, 25 g of a compound having the following formula (20) and 3 g of benzoyl peroxide was added dropwise over a period of 90 minutes.

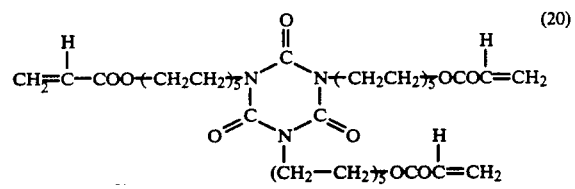

(20)

The reaction mixture was stirred at 90° C. for 4 hours to carry out the polymerization reaction. Thus, a resin dispersion was prepared.
In the above resin dispersion;
  Rate of polymerization: 95%
  Viscosity of the resin dispersion: 180 cp
  Particle diameter of the resin: 0.5 to 1.0 μm
  Content which took place gelation in the resin: 29.3 wt.%

EXAMPLE 83

300 g of the resin dispersion obtained in Example 82 was mixed with 20 g of a commercially available purified bees wax in a flask, followed by stirring at 95° C. for 22 hours.

The above mixture was then cooled, so that a beeswax-containing resin dispersion with a viscosity of 240 cp was prepared.

In the above resin dispersion;
  Particle diameter of the resin: 0.5 to 0.9 μm

EXAMPLE 84

In the same flask as used in Example 80, 300 g of a commercially available silicone oil "KF96L" (Trademark) with a viscosity of 1.0 cs, made by Shin-Etsu Chemical Co., Ltd., serving as a polymerization solvent, and 30 g of colloidal silica were placed and heated to 90° C.

To the above mixture, a solution consisting of 150 g of 2-ethylhexyl methacrylate, 15 g of glycidyl methacrylate, 20 g of a compound having the following formula (21), 40 g of methyl methacrylate and 6.3 g of lauroyl peroxide was added dropwise.

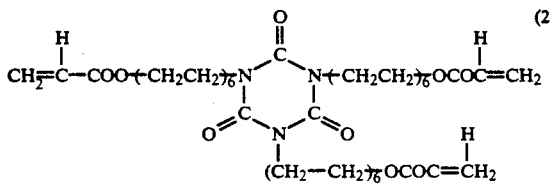

The reaction mixture was further stirred at 90° C. for 4 hours to complete the reaction. Thus, a resin dispersion was prepared.

In the above resin dispersion;
  Rate of polymerization: 93%
  Viscosity of the resin dispersion: 225 cp
  Particle diameter of the resin: 0.5 to 1.0 μm
  Content which took place gelation in the resin: 48 wt.%

EXAMPLE 85

In the same flask as used in Example 80, 300 g of a commercially available silicone oil "KF96L" (Trademark) with a viscosity of 1.5 cs, made by Shin-Etsu Chemical Co., Ltd., serving as a polymerization solvent, and 60 g of commercially available polyethylene "AC Polyethylene 6" (Trademark), made by Allied Chemical Corp., were placed and heated to 95° C.

To the above mixture, a solution consisting of 180 g of stearyl methacrylate, 40 g of lauryl methacrylate, 3 g of fumaric acid, 20 g of a compound having the following formula (22) and 4 g of lauryl peroxide was added dropwise over a period of 3 hours.

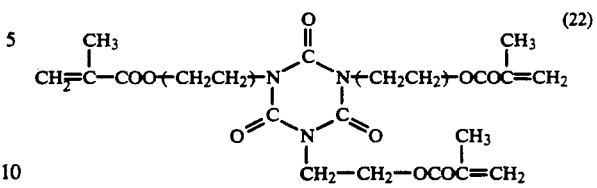

Furthermore, the reaction mixture was stirred at 95° C. for 3 hours to complete the reaction. Thus, a resin dispersion was prepared.

In the above resin dispersion;
  Rate of polymerization: 97.1%
  Viscosity of the resin dispersion: 260 cp
  Particle diameter of the resin: 0.8 to 1.2 μm
  Content which took place gelation in the resin: 28 wt.%

EXAMPLE 86

In the same container as used in Example 80, 300 g of a commercially available silicone oil "HS-200" (Trademark), made by Toray Silicone Co., Ltd., serving as a polymerization solvent, 180 g of cetyl methacrylate, 40 g of dodecyl acrylate, 15 g of a compound having the following formula (23), 5 g of acrylic acid and 3 g of benzoyl peroxide were placed. The mixture was stirred at 90° C. for 6 hours to carry out the polymerization reaction.

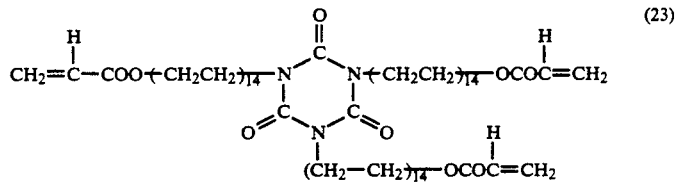

As a result, a resin dispersion was obtained.

In the above resin dispersion;
  Rate of polymerization: 96.0%
  Viscosity of the resin dispersion: 43 cp
  Particle diameter of the resin: 0.2 to 0.6 μm
  Content which took place gelation in the resin: 31.2 wt.%

EXAMPLE 87

In the same flask as used in Example 80, 300 g of a commercially available silicone oil "KF58" (Trademark), made by Shin-Etsu Chemical Co., Ltd., serving as a polymerization solvent, was placed and heated to 95° C.

A mixture of 150 g of 2-ethylhexyl methacrylate, 18 g of a compound having the following formula (24), 50 g of vinyltoluene, 50 g of glycidyl methacrylate and 3 g of azobisisobutyronitrile was added dropwise to the above polymerization solvent over a period of one hour.

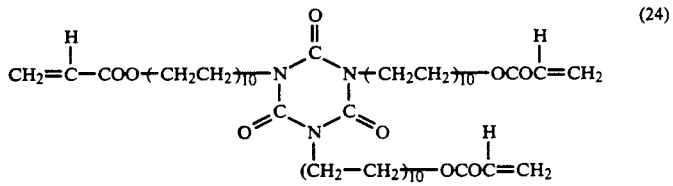
(24)

The temperature of the reaction mixture was maintained at 95° C. for 4 hours to carry out the copolymerization reaction. Thus, a copolymer was obtained.

The thus obtained resin was reprecipitated with methanol, and purified by repeating an operation of dissolving the resin in toluene three times.

COMPARATIVE EXAMPLE 20

The procedure for preparation of the resin in Example 87 was repeated except that the silicone oil used in Example 87 was replaced by toluene, so that a comparative resin was prepared.

The rate of polymerization, the water- and oil-repellency, the electrical resistivity of the resins, the content which took place gelation in the resins obtained in Example 87 and Comparative Example 20 were measured by the same method as in the above. The results are shown in Table 20.

TABLE 20

|  | A (°) | B (°) | C (Ω·cm) | D (%) | N (wt. %) |
|---|---|---|---|---|---|
| Ex. 87 | 39.4 | 26.4 | $3 \times 10^{13}$ | 93.5 | 48 |
| Comp. Ex. 20 | 12 | 10 | $4 \times 10^{12}$ | 90.1 | 25 |

A: Water-repellency
B: Oil-repellency
C: Electrical resistivity
D: Rate of polymerization
N: Content which took place gelation in the resin

EXAMPLE 88

In a 2l-flask equipped with a stirrer, a thermometer and a reflux condenser, 100 g of a commercially available silicone oil "KF58" (Trademark), made by Shin-Etsu Chemical Co., Ltd., serving as a polymerization solvent, was placed and heated to 95° C.

A solution consisting of 190 g of dodecyl methacrylate, 10 g of methacrylic acid, 10 g of a compound having the following formula (25) and 6 g of azobisisobutyronitrile was added dropwise to the above polymerization solvent over a period of 3 hours.

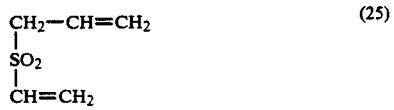
(25)

The reaction mixture was stirred for 4 hours to complete the reaction, with the temperature thereof maintained at 95° C.

As a result, a resin dispersion was obtained.
In the above resin dispersion;
 Rate of polymerization: 95%
 Viscosity of the resin dispersion: 180 cp
 Particle diameter of the resin: 1 to 3 μm
 Content which took place gelation in the resin: 40.5 wt.%

EXAMPLE 89

300 g of the resin dispersion obtained in Example 88 was mixed with 10 g of colloidal silica in a flask.

The above mixture was heated at 100° C. for 3 hours, and cooled. Thus, a colloidal-silica-containing resin dispersion was prepared.

In the above resin dispersion;
 Viscosity of the resin dispersion: 200 cp
 Particle diameter of the resin: 3 to 6 μm

EXAMPLE 90

In the same flask as used in Example 88, 300 g of a commercially available silicone oil "KF-96L" (Trademark) with a viscosity of 2.0 cs, made by Shin-Etsu Chemical Co., Ltd., serving as a polymerization solvent, was placed and heated to 90° C.

To the above polymerization solvent, a solution consisting of b 300 g of lauryl methacrylate, 5 g of N-vinylpyridine, 25 g of a compound having the following formula (26) and 3 g of benzoyl peroxide was added dropwise over a period of 90 minutes.

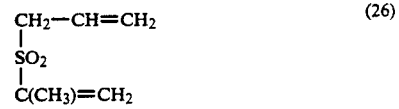
(26)

The reaction mixture was stirred at 90° C. for 4 hours to complete the reaction. Thus, a resin dispersion was prepared.

In the above resin dispersion;
 Rate of polymerization: 96.0%
 Viscosity of the resin dispersion: 240 cp
 Particle diameter of the resin: 3 to 4 μm
 Content which took place gelation in the resin: 28 wt.%

EXAMPLE 91

300 g of the resin dispersion obtained in Example 90 was mixed with 20 g of a commercially available purified bees wax in a flask, followed by stirring at 95° C. for 22 hours.

The above mixture was then cooled, so that a beeswax-containing resin dispersion with a viscosity of 250 cp was prepared.

In the above resin dispersion;
 Particle diameter of the resin: 5 to 8 μm

EXAMPLE 92

In the same flask as used in Example 88, 300 g of a commercially available silicone oil "KF96L" (Trademark) with a viscosity of 1.5 cs, made by Shin-Etsu Chemical Co., Ltd., serving as a polymerization solvent, and 30 g of colloidal silica were placed and heated to 90° C.

To the above mixture, a solution consisting of 150 g of 2-ethylhexyl methacrylate, 15 g of glycidyl methacrylate, 20 g of a compound having the following formula (27), 40 g of methyl methacrylate and 6.3 g of lauroyl peroxide was added dropwise.

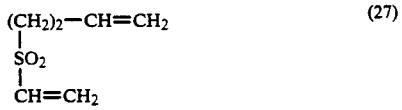
(27)

The reaction mixture was further stirred at 90° C. for 4 hours to complete the reaction. Thus, a resin dispersion was prepared.

In the above resin dispersion;
Rate of polymerization: 98%
Viscosity of the resin dispersion: 260 cp
Particle diameter of the resin: .1 to 3 μm
Content which took place gelation in the resin: 25 wt.%

EXAMPLE 93

In the same flask as used in Example 88, 300 g of a commercially available silicone oil "KF58" (Trademark), made by Shin-Etsu Chemical Co., Ltd., serving as a polymerization solvent, was placed and heated to 95° C.

To the above polymerization solvent, a solution consisting of 150 g of 2-ethylhexyl methacrylate, 31 g of a compound having the following formula (28), 50 g of glycidyl methacrylate and 3 g of azobisisobutyronitrile was added dropwise over a period of one hour.

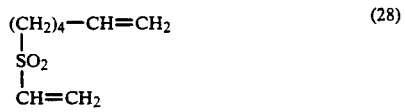
(28)

The temperature of the reaction mixture was maintained at 95° C. for 4 hours to carry out the copolymerization reaction.

The thus obtained resin was reprecipitated with methanol, and purified by repeating an operation of dissolving the resin in toluene three times.

COMPARATIVE EXAMPLE 21

The procedure for preparation of the resin in Example 93 was repeated except that the silicone oil used in Example 93 was replaced by toluene, so that a comparative resin was prepared.

The rate of polymerization, the water- and oil-repellency, the electrical resistivity of the resins, the content which took place gelation in the resins obtained in Example 93 and Comparative Example 21 were measured by the same method as in the above. The results are shown in Table 21.

TABLE 21

| | A (°) | B (°) | C (Ω · cm) | D (%) | N (wt. %) |
|---|---|---|---|---|---|
| Ex. 93 | 31.2 | 25.1 | 4.2 × 10¹³ | 93.8 | 38 |
| Comp. Ex. 21 | 8 | 10 | 1.8 × 10¹² | 90.9 | 19.5 |

A: Water-repellency
B: Oil-repellency
C: Electrical resistivity
D: Rate of polymerization
N: Content which took place gelation in the resin

EXAMPLE 94

In a 3l-flask equipped with a stirrer, a thermometer, a condenser and a dropping funnel, 500 g of a commercially available silicone oil "KF96F" (Trademark) with a viscosity of 2.0 cs, made by Shin-Etsu Chemical Co., Ltd., serving as a polymerization solvent, was placed and heated to 85° C.

A mixture of 100 g of lauryl acrylate, 50 g of a compound having the following formula (29) and 5 g of azobisisobutyronitrile was added dropwise to the above polymerization solvent with stirring over a period of 2 hours.

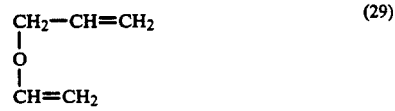
(29)

The reaction mixture was stirred for 4 hours to carry out the polymerization reaction, with the temperature thereof maintained at 85° C. Thereafter, the reaction mixture was maintained at 110° C. for 6 hours, with the addition thereto of 3 g of di-t-butyl peroxide.

As a result, a resin dispersion was obtained.
In the above resin dispersion;
Rate of polymerization: 95.0%
Viscosity of the resin dispersion: 280 cp
Particle diameter of the resin: 4 to 5 μm
Content which took place gelation in the resin: 29 wt.%

EXAMPLE 95

In the same flask as used in Example 94, 400 g of a commercially available silicone oil "HS-200" (Trademark), made by Toray Silicone Co., Ltd., serving as a polymerization solvent, was placed and heated to 60° C.

A mixture of 95 g of stearyl methacrylate, 25 g of a compound having the following formula (30), 10 g of glycidyl methacrylate and 2 g of azobisisobutyronitrile was added dropwise to the above polymerization solvent with stirring over a period of one hour.

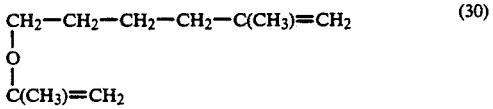
(30)

The polymerization reaction was carried out for 6 hours, with the temperature of the reaction mixture maintained at 60° C. Thereafter, the reaction mixture was stirred at 90° C. for 4 hours, with the addition thereto of 4 g of benzoyl peroxide.

As a result, a resin dispersion was obtained.
In the above resin dispersion;
Rate of polymerization: 96%
Viscosity of the resin dispersion: 250 cp
Particle diameter of the resin: 4 to 8 μm
Content which took place gelation in the resin: 39 wt.%

EXAMPLE 96

In the same flask as used in Example 94, 400 g of a commercially available silicone oil "KF54" (Trademark), made by Shin-Etsu Chemical Co., Ltd., serving as a polymerization solvent, was placed and heated to 90° C.

A mixture of 200 g of lauryl methacrylate, 5 g of vinylpyridine, 10 g of a compound having the following formula (31) and 3 g of benzoyl peroxide was added dropwise to the above polymerization solvent over a period of 4 hours, with stirring.

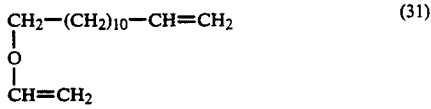

The reaction mixture was stirred at 90° C. for 4 hours to complete the polymerization reaction, with the addition thereto of 30 g of styrene and 3 g of benzoyl peroxide.

As a result, a resin dispersion was obtained.
In the above resin dispersion;
   Rate of polymerization: 95%
   Viscosity of the resin dispersion: 190 cp
   Particle diameter of the resin: 4 to 8 μm
   Content which took place gelation in the resin: 26 wt.%

EXAMPLE 97

In the same flask as used in Example 94, 100 g of a commercially available silicone oil "HS-200" (Trademark), made by Toray Silicone Co., Ltd., serving as a polymerization solvent, and 50 g of a commercially available polyethylene "AC Polyethylene 1106" (Trademark), made by Allied Chemical Corp., were placed and the polyethylene was dissolved in the silicone oil at 90° C.

A mixture of 200 g of a compound having the following formula (32) and 10 g of azobisisobutyronitrile was added dropwise to the above polymerization solvent over a period of 2 hours.

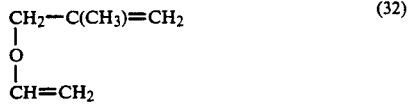

The reaction mixture was stirred for 6 hours, with the temperature thereof maintained at 90° C. Thereafter, the reaction mixture was stirred at 130° C. for 6 hours to complete the polymerization reaction, with the addition thereto of 100 g of cetyl methacrylate and 5 g of t-butyl peroxide.

As a result, a polyethylene-containing resin dispersion was obtained.
In the above resin dispersion;
   Rate of polymerization: 95%
   Viscosity of the resin dispersion: 520 cp
   Content which took place gelation in the resin: 38 wt.%

EXAMPLE 98

18 g of a commercially available polyethylene "AC Polyethylene 615" (Trademark), made by Allied Chemical Corp., was added to the resin dispersion obtained in Example 95 and dissolved therein at 90° C. for 2 hours.

Thereafter, the above mixture was cooled, so that a polyethylene-containing resin dispersion with a viscosity of 320 cp was obtained.

EXAMPLE 99

40 g of a commercially available wax "Sanwax 131-P" (Trademark), made by Sanyo Chemical Industries, Ltd., was added to the polyethylene-containing resin dispersion obtained in Example 97 and dissolved therein at 90° C. for 2 hours.

Thereafter, the above mixture was cooled, so that a polyethylene-and-wax-containing resin dispersion with a viscosity of 580 cp was obtained.

EXAMPLE 100

In the same flask as used in Example 94, 300 g of a commercially available silicone oil "KF58" (Trademark), made by Shin-Etsu Chemical Co., Ltd., serving as a polymerization solvent, was placed and heated to 95° C.

A mixture of 150 g of 2-ethylhexyl methacrylate, 15 g of a compound having the following formula (33), 50 g of glycidyl methacrylate and 3 g of azobisisobutyronitrile was added dropwise to the above polymerization solvent over a period of one hour.

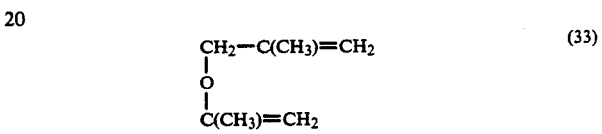

The polymerization reaction was carried out over a period of 4 hours, with the temperature of the reaction mixture maintained at 95° C. The thus obtained resin was reprecipitated with methanol, and purified by repeating an operation of dissolving the resin in toluene three times.

COMPARATIVE EXAMPLE 22

The procedure for preparation of the resin in Example 100 was repeated except that the silicone oil used in Example 100 was replaced by toluene, so that a comparative resin was prepared.

The rate of polymerization, the water- and oil-repellency, the electrical resistivity of the resins, the content which took place gelation in the resins obtained in Example 100 and Comparative Example 22 were measured by the same method as in the above. The results are shown in Table 22.

TABLE 22

| | A (°) | B (°) | C (Ω·cm) | D (%) | N (wt. %) |
|---|---|---|---|---|---|
| Ex. 100 | 39 | 28.4 | $1.2 \times 10^{13}$ | 96.5 | 42 |
| Comp. Ex. 22 | 10 | 12 | $3.5 \times 10^{12}$ | 88.1 | 16 |

A: Water-repellency
B: Oil-repellency
C: Electrical resistivity
D: Rate of polymerization
N: Content which took place gelation in the resin

EXAMPLE 101

In a 3l-flask equipped with a stirrer, a thermometer, a condenser and a dropping funnel, 500 g of a commercially available silicone oil "KF96L" (Trademark) with a viscosity of 1.5 cs, made by Shin-Etsu Chemical Co., Ltd., serving as a polymerization solvent, was placed and heated to 85° C.

A mixture of 100 g of lauryl acrylate, 50 g of a compound having the following formula (1) and 5 g of azobisisobutyronitrile was added dropwise to the above polymerization solvent with stirring over a period of 2 hours.

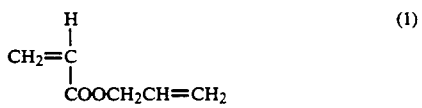

$$\text{CH}_2=\overset{\text{H}}{\underset{\text{COOCH}_2\text{CH}=\text{CH}_2}{\text{C}}} \quad (1)$$

The reaction mixture was stirred for 4 hours to carry out the polymerization reaction, with the temperature thereof maintained at 85° C. Thereafter, the reaction mixture was maintained at 110° C. for 6 hours, with the addition thereto of 3 g of di-t-butyl peroxide.

As a result, a resin dispersion was obtained.
In the above resin dispersion;
Rate of polymerization: 95.0%
Content which took place gelation in the resin: 25 wt.%

EXAMPLE 102

In the same flask as used in Example 101, 400 g of a commercially available silicone oil "KF58" (Trademark), made by Shin-Etsu Chemical Co., Ltd., serving as a polymerization solvent, was placed and heated to 60° C.

A mixture of 95 g of 2-ethylhexyl methacrylate, 25 g of a compound having the following formula (2) and 2 g of azobisisobutyronitrile was added dropwise to the above polymerization solvent with stirring over a period of one hour.

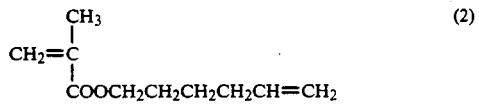

$$\text{CH}_2=\overset{\text{CH}_3}{\underset{\text{COOCH}_2\text{CH}_2\text{CH}_2\text{CH}_2\text{CH}=\text{CH}_2}{\text{C}}} \quad (2)$$

The polymerization reaction was carried out for 6 hours, with the temperature of the reaction mixture maintained at 60° C. Thereafter, the reaction mixture was stirred at 90° C. for 4 hours, with the addition thereto of 4 g of benzoyl peroxide.

As a result, a resin dispersion was obtained.
In the above resin dispersion;
Rate of polymerization: 96.2%
Content which took place gelation in the resin: 32 wt.%

EXAMPLE 103

In the same flask as used in Example 101, 400 g of a commercially available silicone oil "HS-200" (Trademark), made by Toray Silicone Co., Ltd., serving as a polymerization solvent, was placed and heated to 90° C.

A mixture of 200 g of cyclohexyl acrylate, 10 g of a compound having the following formula (3) and 3 g of benzoyl peroxide was added dropwise to the above polymerization solvent over a period of 4 hours, with stirring.

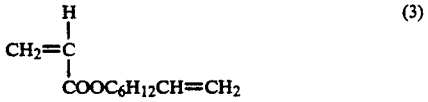

$$\text{CH}_2=\overset{\text{H}}{\underset{\text{COOC}_6\text{H}_{12}\text{CH}=\text{CH}_2}{\text{C}}} \quad (3)$$

The reaction mixture was stirred at 90° C. for 4 hours to complete the polymerization reaction, with the addition thereto of 30 g of styrene and 3 g of benzoyl peroxide.

As a result, a resin dispersion was obtained.
In the above resin dispersion;
Rate of polymerization: 95.8%
Content which took place gelation in the resin: 35 wt.%

EXAMPLE 104

In the same flask as used in Example 101, 200 g of a commercially available silicone oil "TSF401" (Trademark), made by Toshiba Silicone Co., Ltd., serving as a polymerization solvent, and 50 g of a commercially available polyethylene "AC Polyethylene 1106[ (Trademark), made by Allied Chemical Corp., were placed and the polyethylene was dissolved in the silicone oil at 90° C.

A mixture of 200 g of a compound having the following formula (4) and 10 g of azobisisobutyronitrile was added dropwise to the above polymerization solvent over a period of 2 hours.

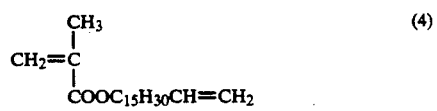

$$\text{CH}_2=\overset{\text{CH}_3}{\underset{\text{COOC}_{15}\text{H}_{30}\text{CH}=\text{CH}_2}{\text{C}}} \quad (4)$$

The reaction mixture was stirred for 6 hours, with the temperature thereof maintained at 90° C. Thereafter, the reaction mixture was stirred at 130° C. for 6 hours to complete the polymerization reaction, with the addition thereto of 100 g of cetyl methacrylate and 5 g of t-butyl peroxide.

As a result, a polyethylene-containing resin dispersion was obtained.
In the above resin dispersion;
Rate of polymerization: 98.0%
Viscosity of the resin dispersion: 250 cp

EXAMPLE 105

In the same flask as used in Example 101, 300 g of dimethyl silicone oil with a viscosity of 1.5 cs, serving as a polymerization solvent, was placed and heated to 95° C.

A mixture of 150 g of 2-ethylhexyl methacrylate, 20 g of the above-mentioned compound having formula (1), 150 g of styrene and 3 g of azobisisobutyronitrile was added dropwise to the above polymerization solvent over a period of one hour.

The polymerization reaction was carried out over a period of 4 hours, with the temperature of the reaction mixture maintained at 95° C. The thus obtained resin was reprecipitated with methanol, and purified by repeating an operation of dissolving the resin in toluene three times.

COMPARATIVE EXAMPLE 23

The procedure for preparation of the resin in Example 105 was repeated except that the dimethyl silicone oil used in Example 105 was replaced by toluene, so that a comparative resin was prepared.

The rate of polymerization, the water- and oil-repellency, the electrical resistivity of the resins, the content which took place gelation in the resins obtained in Example 105 and Comparative Example 23 were measured by the same method as in the above. The results are shown in Table 23.

TABLE 23

|  | A (°) | B (°) | C (Ω · cm) | D (%) | N (wt. %) |
|---|---|---|---|---|---|
| Ex. 105 | 29 | 24 | 9.8 × 10¹³ | 91.5 | 34 |

TABLE 23-continued

|  | A (°) | B (°) | C (Ω·cm) | D (%) | N (wt. %) |
|---|---|---|---|---|---|
| Comp. Ex. 23 | 10 | 8 | $1.2 \times 10^{11}$ | 89 | 20 |

A: Water-repellency
B: Oil-repellency
C: Electrical resistivity
D: Rate of polymerization
N: Content which took place gelation in the resin

EXAMPLE 106

In a flask with four arms equipped with a stirrer, a thermometer and a condenser, 200 g of a commercially available silicone oil "HS-200" (Trademark), made by Toray Silicone Co., Ltd., serving as a polymerization solvent, was placed and heated to 90° C. on an oil bath.

A mixture of 100 g of stearyl acrylate, 3 g of ethylene glycol methacrylate, 30 g of glycidyl methacrylate and 5 g of azobisisobutyronitrile was added to the above polymerization solvent. The temperature of the reaction mixture was maintained at 90° C. for 5 hours to carry out the polymerization reaction. Thus, a copolymer was obtained.

Thereafter, 0.5 g of hydroquinone, 20 g of β-methacryloxyethyl acid phthalate and 0.02 g of lauryl dimethylamine were added to the above copolymer, and the esterification reaction was carried out at 85° C. for 5 to 10 hours. Thus, the above copolymer was esterified.

In addition, the graft copolymerization was performed with the addition of 50 g of styrene and 1 g of benzoyl peroxide to the above copolymer.

To the above-prepared graft copolymer dispersion, 50 g of a commercially available polyethylene "AC Polyethylene A" (Trademark), made by Allied Chemical Corp., was added and dissolved therein for 4 hours at a temperature ranging from 80° to 90° C.

Sequentially, the above reaction mixture was separated from the oil bath and cooled using tap water, so that a resin dispersion was prepared.

EXAMPLE 107

In the same flask as used in Example 106, 200 g of a commercially available silicone oil "KF58" (Trademark), made by Shin-Etsu Chemical Co., Ltd., serving as a polymerization solvent, was placed and heated to 90° C. on an oil bath.

A mixture of 100 g of cetyl methacrylate, 5 g of 1,3-butylene glycol diacrylate, 20 g of β-methacryloxyethyl acid hexahydrophthalate and 3 g of benzoyl peroxide was added to the above polymerization solvent. The temperature of the reaction mixture was maintained at 100° C for 4 hours to carry out the polymerization reaction. Thus, a copolymer was obtained.

Thereafter, 1 g of hydroquinone, 10 g of glycidyl methacrylate and 0.01 g of dodecylamine were added to the above copolymer, and the esterification reaction was carried out at 80° C. for 10 hours. Thus, the above copolymer was esterified.

In addition, the graft copolymerization was performed at 90° C. for 3 hours with the addition of 30 g of methyl methacrylate and 0.05 g of azobisisobutyronitrile to the above copolymer.

To the above-prepared graft copolymer dispersion, 30 g of a commercially available low-molecular-weight polyethylene "Sanwax E200" (Trademark), made by Sanyo Chemical Industries, Ltd., was added. Then, the reaction mixture was heated at 90° C. for one hour, so that a resin dispersion was prepared.

EXAMPLE 108

In the same flask as used in Example 106, 300 g of a commercially available silicone oil "KF54" (Trademark), made by Shin-Etsu Chemical Co., Ltd., serving as a polymerization solvent, was placed and heated to 80° C.

A mixture of 100 g of lauryl methacrylate, 8 g of tetramethylolmethane tetraacrylate, 25 g of glycidyl acrylate and 3 g of lauroyl peroxide was added to the above polymerization solvent. The temperature of the reaction mixture was maintained at 80° C. for 5 hours to carry out the copolymerization reaction. Thus, a copolymer was obtained.

Thereafter, 0.1 g of hydroquinone, 0.001 g of lauryl dimethylamine and 20 g of a compound of the following formula (8) were added to the above copolymer, and the esterification reaction was carried out at 80° C. for 10 hours. Thus, the above copolymer was esterified.

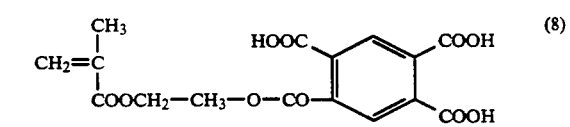

In addition, 30 g of vinyl acetate was added to the above reaction mixture, so that a graft-copolymer dispersion was prepared.

COMPARATIVE EXAMPLE 24

The procedure for preparation of the resin dispersion in Example 106 was repeated except that the commercially available silicone oil "HS-200" (Trademark), made by Toray Silicone Co., Ltd., used in Example 106 was replaced by toluene, so that a comparative dispersion was prepared.

COMPARATIVE EXAMPLE 25

The procedure for preparation of the resin dispersion in Example 107 was repeated except that the commercially available silicone oil "KF58" (Trademark), made by Shin-Etsu Chemical Co., Ltd., used in Example 107 was replaced by toluene, so that a comparative dispersion was prepared.

COMPARATIVE EXAMPLE 26

The procedure for preparation of the resin dispersion in Example 108 was repeated except that the commercially available silicone oil "KF54" (Trademark), made by Shin-Etsu Chemical Co., Ltd., used in Example 108 was replaced by toluene, so that a comparative dispersion was prepared.

The degree of esterification, the rate of polymerization, the particle diameter of the resin, the dispersion stability and the water-repellency of the resin dispersions obtained in Examples 106 to 108 and the comparative dispersions obtained in Comparative Examples 24 to 26 were measured. The results are given in Table 24.

TABLE 24

|  | Ex. 106 | Comp. Ex. 24 | Ex. 107 | Comp. Ex. 25 | Ex. 108 | Comp. Ex. 26 |
|---|---|---|---|---|---|---|
| A(°) | 38 | 11 | 25 | 8 | 29 | 10 |
| D(%) | 96.5 | 95.8 | 95.8 | 95.0 | 98.2 | 94.5 |
| G | ○ | x | ○ | x | ○ | x |

TABLE 24-continued

| | Ex. 106 | Comp. Ex. 24 | Ex. 107 | Comp. Ex. 25 | Ex. 108 | Comp. Ex. 26 |
|---|---|---|---|---|---|---|
| J (μm) | 0.1~0.2 | 10~20 | 0.2~0.3 | 5~10 | 0.5~1.0 | 20~30 |
| M(%) | 42 | 25 | 50 | 20 | 55 | 20 |

A: Water-repellency
D: Rate of polymerization
G': Dispersion stability, measured by allowing the obtained resin dispersions to stand at room temperature for 30 days.
○ - No sedimentation was observed.
x - Sedimentation occurred.
J: Particle diameter of the resin in the resin dispersion
M: The rate of polymerization of the obtained graft copolymer.

EXAMPLE 109

In the same flask as used in Example 106, 300 g of dimethyl silicone oil with a viscosity of 1.5 cs, serving as a polymerization solvent, was placed and heated to 95° C.

A mixture of 150 g of 2-ethylhexyl methacrylate, 5 g of ethylene glycol dimethacrylate, 50 g of glycidyl methacrylate and 3 g of azobisisobutyronitrile was added dropwise to the above polymerization solvent over a period of one hour. The temperature of the reaction mixture was maintained at 95° C. for 4 hours to carry out the polymerization reaction. Thus, a copolymer was obtained.

Thereafter, 10 g of β-methacryloxyethyl acid phthalate and 0.1 g of pyridine were added to the above copolymer, and the esterification reaction was carried out at 80° C. for 12 hours. Thus, the above copolymer was esterified.

In addition, the polymerization reaction was continued at 90° C. for 3 hours with the addition of 50 g of styrene and 3 g of benzoyl peroxided to the above reaction mixture.

The thus obtained resin was reprecipitated with methanol, and purified by repeating an operation of dissolving the resin in toluene three times.

COMPARATIVE EXAMPLE 27

The procedure for preparation of the resin in Example 109 was repeated except that the dimethyl silicone oil used in Example 109 was replaced by toluene, so that a comparative resin was prepared.

The rate of polymerization, the water- and oil-repellency and the electrical resistivity of the resins obtained in Example 109 and Comparative Example 27 were measured by the same method as in the above. The results are shown in Table 25.

TABLE 25

| | A (°) | B (°) | C (Ω·cm) | D (%) |
|---|---|---|---|---|
| Ex. 109 | 25 | 20 | 3.8 × 10¹³ | 96.2 |
| Comp. Ex. 27 | 10 | 10 | 5.2 × 10¹¹ | 90.2 |

A: Water-repellency
B: Oil-repellency
C: Electrical resistivity
D: Rate of polymerization As previously mentioned, the method for preparing the resin according to the present invention has the following advantages:

(1) Resins having no odor, which are reliable from the viewpoint of safety can be obtained.

(2) The rate of polymerization of the obtained resin can be increased.

(3) The water- and oil-repellency and the electrical insulating properties of the obtained resins can be improved.

(4) The resins can easily be separated from the solvent for polymerization, and the dispersion stability of the resin dispersion is also improved.

(5) The polymerization temperature is freely selected within a considerably wide range.

(6) The surface gloss of the obtained resins can be improved.

(7) The preservability of the obtained resins, such as the resistance to heat and cold, is excellent.

What is claimed is:

1. A method for producing a vinyl resin comprising the steps of:

forming a polymerization system comprising a polymerizable vinyl monomer dissolved or dispersed in a polymerization solvent comprising a silicone oil, finely-divided particles of silica, and a wax or polyolefin having a softening point of about 60° to 130° C., polymerizing said polymerizable vinyl monomer in the presence of a polymerization catalyst, and separating polymerized resin from polymerization solvent.

2. The method for producing a vinyl resin as claimed in claim 1, wherein said silicone oil is selected from the group consisting of a dialkyl silicone oil having formula (I); a cyclic polydialkyl siloxane or cyclic polyalkylphenyl siloxane; an alkylphenyl siloxane; a higher fatty acidmodified silicone oil; methyl chlorinated phenyl silicone oil; an alkyl-modified silicone oil; a methylhydrogen silicone oil; an amino-modified silicone oil; and an epoxy-modified silicone;

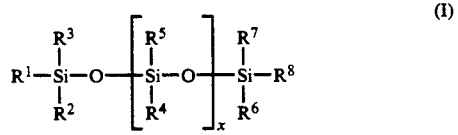

(I)

wherein $R^1$, $R^2$, $R^3$, $R^4$, $R^5$, $R^6$, $R^7$ and $R^8$ independently represent $—C_nH_{2n+1}$, in which n is an integer of 1 to 20; and x is an integer of 0 or more.

3. The method for producing a vinyl resin as claimed in claim 1, wherein said silicone oil is a dialkyl silicone oil having formula (I);

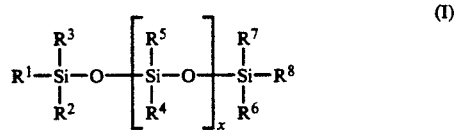

(I)

wherein $R^1$, $R^2$, $R^3$, $R^4$, $R^5$, $R^6$, $R^7$ and $R^8$ independently represent $—C_nH_{2n+1}$, in which n is an integer of 1 to 20; and x is an integer of 0 or more.

4. The method for producing a vinyl resin as claimed in claim 3, wherein said dialkyl silicone oil is dimethyl polysiloxane.

5. The method for producing a vinyl resin as claimed in claim 3, wherein said dialkyl silicone oil has a viscosity of 0.01 to 1,000,000 cs (centistokes) at 25° C.

6. The method for producing a vinyl resin as claimed in claim 3, wherein x in said formula (I) of said dialkyl silicone oil is in the range of 1 to 20,000.

7. The method for producing a vinyl resin as claimed in claim 1, wherein said silicone oil is a cyclic polydialkyl siloxane or cyclic polyalkylphenyl siloxane.

8. The method for producing a vinyl resin as claimed in claim 1, wherein said silicone oil is an alkylphenyl siloxane.

9. The method for producing a vinyl resin as claimed in claim 8, wherein said alkylphenyl siloxane is methylphenyl siloxane.

10. The method for producing a vinyl resin as claimed in claim 1, wherein said silicone oil is used in combination with a solvent selected from the group consisting of aromatic hydrocarbons, ethers, esters, alcohol-based solvents and aliphatic hydrocarbons.

11. The method for producing a vinyl resin as claimed in claim 10, wherein the amount of said solvent is about 0.1 to 500 parts by weight of 100 parts by weight of said silicone oil.

12. The method for producing a vinyl resin as claimed in claim 1, wherein said polymerizable vinyl monomer is graft-polymerized into other resins.

13. The method for producing a vinyl resin as claimed in claim 1, wherein said polymerizable vinyl monomer is subjected to copolymerization in the presence of a crosslinking agent.

14. The method for producing a vinyl resin as claimed in claim 13, wherein said crosslinking agent is a divinyl monomer.

15. The method for producing a vinyl resin as claimed in claim 1, wherein the mixing ratio of said polymerization solvent comprising said silicone oil to said polymerizable vinyl monomer to said polymerization catalyst be about (10 to 90) : (10 to 90) : (0.001 to 5).

* * * * *

UNITED STATES PATENT AND TRADEMARK OFFICE
CERTIFICATE OF CORRECTION

PATENT NO. : 5,189,102
DATED : February 23, 1933
INVENTOR(S) : Kazuo Tsubuko, et al It is certified that error appears in the above-indentified patent and that said Letters Patent is hereby corrected as shown below:

Column 4, line 5, after "Alkylphenyl", insert --siloxane--.

Column 7, line 13, "ar" should read --are--.

Column 32, line 8, "wa" should read --was--.

Signed and Sealed this

Sixteenth Day of August, 1994

*Attest:*

BRUCE LEHMAN

*Attesting Officer*   *Commissioner of Patents and Trademarks*